United States Patent
Fan et al.

(10) Patent No.: US 12,127,209 B2
(45) Date of Patent: Oct. 22, 2024

(54) DATA TRANSMISSION METHOD AND DEVICE

(71) Applicant: Huawei Technologies Co., Ltd., Shenzhen (CN)

(72) Inventors: Bo Fan, Chengdu (CN); Xiaoyong Tang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 493 days.

(21) Appl. No.: 17/339,578

(22) Filed: Jun. 4, 2021

(65) Prior Publication Data

US 2021/0298001 A1 Sep. 23, 2021

Related U.S. Application Data

(63) Continuation of application No. PCT/CN2019/123174, filed on Dec. 5, 2019.

(30) Foreign Application Priority Data

Dec. 5, 2018 (CN) .......................... 201811483589.X

(51) Int. Cl.
*H04W 72/23* (2023.01)
*H04L 5/00* (2006.01)

(52) U.S. Cl.
CPC ........... *H04W 72/23* (2023.01); *H04L 5/0053* (2013.01)

(58) Field of Classification Search
CPC . H04W 72/23; H04W 72/53; H04W 72/0046; H04L 5/0053; H04L 5/0051; H04L 1/0004
See application file for complete search history.

(56) References Cited

U.S. PATENT DOCUMENTS

| 2015/0078304 | A1 | 3/2015 | Han et al. | |
| 2015/0156753 | A1 | 6/2015 | Shan et al. | |
| 2020/0137762 | A1* | 4/2020 | Khoshnevisan | ...... H04L 5/0035 |
| 2020/0367208 | A1* | 11/2020 | Khoshnevisan | ...... H04L 5/0048 |

FOREIGN PATENT DOCUMENTS

| CN | 107197528 A | 9/2017 |
| CN | 107888236 A | 4/2018 |
| CN | 108024375 A | 5/2018 |
| CN | 108092754 A | 5/2018 |

(Continued)

OTHER PUBLICATIONS

NTT Docomo, Inc., "Enhancements on multi-TRP/panel transmission", 3GPP TSG RAN WG1 Meeting #95, R1-1813333, Spokane, WA, US, Nov. 12-16, 2018, 20 pages.

(Continued)

*Primary Examiner* — Justin Y Lee
(74) *Attorney, Agent, or Firm* — Slater Matsil, LLP

(57) ABSTRACT

This application discloses a data transmission method and apparatus. A network device determines first information, where the first information is used to indicate transmission parameters required for a plurality of transmissions of to-be-transmitted data; the network device sends the first information to a terminal device; and the network device sends the to-be-transmitted data to the terminal device for a plurality of times based on the first information.

17 Claims, 8 Drawing Sheets

(56) References Cited

FOREIGN PATENT DOCUMENTS

| CN | 108199819 A | 6/2018 |
|---|---|---|
| CN | 108260214 A | 7/2018 |
| CN | 108347307 A | 7/2018 |
| CN | 108737040 A | 11/2018 |
| EP | 3340726 A1 | 6/2018 |
| EP | 3761549 A1 | 1/2021 |
| WO | 2018082681 A1 | 5/2018 |

OTHER PUBLICATIONS

Nokia et al., "Beam Management Procedures in Beam Based Access", 3GPP TSG-RAN WG1#86, R1-167286, Gothenburg, Sweden, Aug. 22-26, 2016, 5 pages.

Samsung, "On Beam Management Measurement and Reporting", 3GPP TSG RAN WG1 Meeting 90bis, R1-1717605, Prague, CZ, Oct. 9-13, 2017, 16 pages.

3GPP TS 38.211 V15.3.0 (Sep. 2018), "3rd Generation Partnership Project; Technical Specification Group Radio Access Network; NR; Physical channels and modulation (Release 15)", 93 pages.

Samsung, "On Beam Indication", 3GPP TSG RAN WG1 Meeting 90bis, R1-1717627, Prague, CZ, Oct. 9-13, 2017, 9 pages.

3GPP TS 38.212 V15.3.0 (Sep. 2018), 3rd Generation Partnership Project; Technical Specification Group Radio Access Network; NR; Multiplexing and channel coding (Release 15), 95 pages.

ZTE, "WF on DL beam indication", 3GPP TSG RAN WG1 Meeting 90bis, R1-1719010, Prague, Czechia, Oct. 9-13, 2017, 3 pages.

3GPP TS 38.213 V15.3.0 (Sep. 2018), 3rd Generation Partnership Project; Technical Specification Group Radio Access Network; NR; Physical layer procedures for control (Release 15), 101 pages.

3GPP TS 38.214 V15.3.0 (Sep. 2018), 3rd Generation Partnership Project; Technical Specification Group Radio Access Network;NR; Physical layer procedures for data (Release 15), 96 pages.

3GPP TS 38.331 V15.3.0 (Sep. 2018), 3rd Generation Partnership Project; Technical Specification Group Radio Access Network; NR; Radio Resource Control (RRC) protocol specification (Release 15), 445 pages.

ZTE, "Enhancements on multi-TRP/Panel transmission", 3GPP TSG RAN WG1 Meeting #95, R1-1812256, Spokane, WA, USA, Nov. 12-16, 2018, 14 pages.

* cited by examiner

DATA TRANSMISSION METHOD AND DEVICE

CROSS-REFERENCE TO RELATED APPLICATIONS

This application is a continuation of International Application No. PCT/CN2019/123174, filed on Dec. 5, 2019, which claims priority to Chinese Patent Application No. 201811483589.X, filed on Dec. 5, 2018. The disclosures of the aforementioned applications are hereby incorporated by reference in their entireties.

TECHNICAL FIELD

This application relates to the field of communications technologies, and in particular, to a data transmission method and device.

BACKGROUND

A 5th generation (5G) mobile communications system uses high-frequency communication, to be specific, uses an ultra-high frequency band (>6 GHz) signal to transmit data. A main problem of the high-frequency communication is that signal energy sharply decreases as a transmission distance increases, resulting in a short signal transmission distance. To resolve this problem, the high-frequency communication uses an analog beam technology to perform weighting by using a large-scale antenna array, so that the signal energy is concentrated in a relatively small range to form an analog beam signal, thereby increasing the transmission distance. Communication based on an analog beam can resolve the problem that a high-frequency signal has a short transmission distance, but cannot resolve another problem of the high-frequency communication: a high-frequency signal is easily blocked. The high-frequency signal has a short wavelength and a weak diffraction capability, and even a relatively small obstacle (such as a vehicle or a pedestrian) can easily block the high-frequency signal. Consequently, signal strength is greatly attenuated.

This problem is resolved by using a multi-beam polling transmission method. To be specific, a plurality of beams is used to transmit same data in turn. A network device may transmit same to-be-transmitted data in a plurality of adjacent slots by using different beams, and the to-be-transmitted data can be correctly transmitted provided that one beam is not blocked. In this way, impact imposed by an obstacle to data transmission is greatly reduced. During the multi-beam polling transmission, one piece of downlink control information (DCI) needs to be used each time the network device sends the to-be-transmitted data to a terminal device, where the DCI may carry transmission parameters required for each data transmission, for example, a transmission configuration indicator (TCI), a time-frequency resource, and a hybrid automatic repeat request (HARQ) sequence number. The DCI may be used to indicate the terminal device to receive the data by using these transmission parameters.

However, during the high-frequency communication, the DCI is transmitted by using a physical downlink control channel (PDCCH) analog beam. Because the analog beam can cover only a relatively small range, the PDCCH analog beam usually can cover only a relatively small quantity of terminal devices, and a quantity of terminal devices scheduled each time is limited by a quantity of PDCCH beams. If one piece of DCI is used each time the network device sends the to-be-transmitted data to the terminal device, DCI resources are wasted. Consequently, downlink transmission to another terminal device cannot be performed, and cell data transmission performance is affected.

SUMMARY

This application provides a data transmission method, so that a network device does not need to use DCI to indicate a transmission parameter for each data transmission. This reduces DCI resources and improves cell data transmission performance.

According to a first aspect, an embodiment of this application provides a data transmission method. The method includes: A network device determines first information, where the first information is used to indicate transmission parameters required for a plurality of transmissions of to-be-transmitted data; the network device sends the first information to a terminal device; and the network device sends the to-be-transmitted data to the terminal device for a plurality of times based on the first information. In a scenario, the network device may transmit the to-be-transmitted data to the terminal device for a plurality of times in different transmission time units by using different beams. In addition, the network device needs to indicate, to the terminal device, a transmission parameter required for each of the plurality of data transmissions, so that the terminal device can receive, by using the transmission parameter indicated by the network device, the to-be-transmitted data sent by the network device each time.

In the embodiment of the first aspect, the network device may determine the first information, and send the first information to the terminal device to indicate, to the terminal device, the transmission parameter required for each of the plurality of data transmissions. The first information may include a transmission configuration indicator (TCI) set, where the TCI set includes a plurality of TCIs, TCIs used for the plurality of transmissions belong to the TCI set, and each TCI number may indicate one piece of beam information. That the network device sends the first information to the terminal device is equivalent to indicating, to the terminal device, beam information corresponding to the plurality of transmissions. After receiving the first information, the terminal device may learn of the TCIs required for the plurality of transmissions, and then receive, by using the beam information corresponding to the TCIs, the to-be-transmitted data sent by the network device for a plurality of times. In this embodiment of this application, each TCI number may further indicate one reference signal antenna port, each reference signal antenna port corresponds to one of the plurality of transmissions of the to-be-transmitted data, and the reference signal antenna port has a quasi-co-location (QCL) relationship with one piece of beam information. After receiving the TCI set, the terminal device may determine, based on a correspondence between each TCI number and each transmission of the to-be-transmitted data, each reference signal antenna port corresponding to each transmission. Because the reference signal antenna port has the quasi-co-location (QCL) relationship with the piece of beam information, the terminal device may determine, based on the beam information having the quasi-co-location (QCL) relationship with the reference signal antenna port, a beam having the QCL relationship with the reference signal antenna port, and receive, by using the beam, the to-be-transmitted data sent by the network device for a specific time.

It can be learned from the first aspect that, because the first information indicates the transmission parameters required for the plurality of transmissions of the to-be-transmitted data to the terminal device, the terminal device may determine, based on the first information, the transmission parameters required for the plurality of transmissions of the to-be-transmitted data, and then receive the to-be-transmitted data for a plurality of times by using the transmission parameters, so that the network device does not need to use DCI to indicate a transmission parameter for each data transmission. This reduces DCI resources and improves downlink data transmission performance.

In a possible design of the first aspect, the data transmission method further includes: The network device sends second information to the terminal device, where the second information is used to indicate a target TCI subset, and the target TCI subset is a subset of the TCI set. The network device may send the second information to the terminal device to indicate the terminal device to use one TCI subset of the TCI set as the transmission parameters required for the plurality of transmissions. The TCI subset includes at least one TCI, and each TCI number in the TCI subset corresponds to one of the plurality of transmissions of the to-be-transmitted data. After receiving the TCI subset, the terminal device may determine, based on a correspondence between a TCI number in the TCI subset and each transmission of the to-be-transmitted data, beam information corresponding to each transmission, and then receive, by using a beam corresponding to the beam information, the to-be-transmitted data sent by the network device for a specific time.

In this embodiment, the second information indicating the target TCI subset is sent to the terminal device, so that the network device can indicate, according to an actual requirement, the terminal device to use the target TCI subset of the TCI set as the transmission parameters required for the plurality of transmissions. This improves flexibility of the solution.

In a possible design of the first aspect, the data transmission method further includes: The network device determines third information, where the third information is used to indicate to traverse the TCI set in a first order to obtain the TCIs used for the plurality of transmissions, and the first order includes a cyclic ascending order of numbers of the TCIs in the TCI set, or a cyclic descending order of numbers of the TCIs in the TCI set, or an order of the TCIs in the TCI set. From the perspective of time domain, the data transmissions performed by the network device may correspond to the TCIs in a specific TCI number order. Specifically, the data transmissions performed by the network device may correspond to the TCIs in a specific TCI number order in a plurality of consecutive transmission time units. In this embodiment, the network device may determine the third information. For the network device, the network device may traverse the TCI set in the first order indicated by the third information, to obtain the TCIs used for the plurality of transmissions, and send the to-be-transmitted data to the terminal device for a plurality of times by using the TCIs obtained through traversal.

In a possible design of the first aspect, the data transmission method further includes: The network device sends the third information to the terminal device, and after the terminal device receives the third information, the terminal device may traverse the TCI set in the first order based on the third information to obtain the TCIs used for the plurality of transmissions.

In a possible design of the first aspect, the network device may further send, to the terminal device, a TCI number used for the first transmission in the plurality of transmissions of the to-be-transmitted data. For example, the TCI set is {TCI 1, TCI 2, TCI 3, TCI 4, TCI 5, TCI 6, TCI 7, TCI 8, TCI 9}. If the TCI number used for the first transmission in the plurality of transmissions of the to-be-transmitted data is the TCI 3, and the first order indicates the cyclic ascending order of the numbers of the TCIs in the TCI set, the network device may determine that TCIs used for transmitting the to-be-transmitted data in the plurality of consecutive transmission time units are sequentially the TCI 3, the TCI 4, the TCI 5, the TCI 6, the TCI 7, the TCI 8, and the TCI 9.

In a possible design of the first aspect, the first information may further include a quantity of times of transmitting the to-be-transmitted data. Optionally, when the quantity of times for which the network device sends the to-be-transmitted data to the terminal device is greater than a quantity of TCIs included in the TCI set or the target TCI subset, the network device may traverse the TCI set or the target TCI subset in the first order to obtain the TCIs used for the plurality of transmissions, and re-traverse the TCI set or the target TCI subset after traversing each TCI in the TCI set or the target TCI subset.

In a possible design of the first aspect, the first information includes an identifier of the network device that transmits the to-be-transmitted data. In a scenario in which a plurality of network devices schedule transmission control information to one terminal device, in addition to indicating a beam used for each transmission, the first information further needs to indicate a specific network device that sends the beam used for each transmission. Specifically, each TCI in the TCI set may be associated with one network device. It should be noted that, in this scenario, a quantity of network devices may be less than a quantity of TCIs used for the plurality of transmissions. In the first information, the identifier of the network device may be associated with at least one TCI in the TCI set. In other words, one network device may be associated with a plurality of TCIs.

In a possible design of the first aspect, the first information and the third information are encapsulated in radio resource control (RRC).

In a possible design of the first aspect, the second information is encapsulated in either or both of the following information: a media access control control element (MAC CE) and a physical downlink control channel (PDCCH).

According to a second aspect, an embodiment of this application provides a data transmission method. The method includes: A network device determines fourth information, where the fourth information is used to indicate a relationship between transmission parameters required for a plurality of transmissions of to-be-transmitted data; and the network device sends the to-be-transmitted data to a terminal device for a plurality of times based on the fourth information. The network device may send the to-be-transmitted data to the terminal device based on the relationship that is indicated by the fourth information and that is between the transmission parameters required for the plurality of transmissions of the to-be-transmitted data, and the terminal device may receive, based on the relationship between the transmission parameters required for the plurality of transmissions of the to-be-transmitted data, the to-be-transmitted data sent by the terminal device for a plurality of times. The terminal device may determine, by using a protocol, the relationship between the transmission parameters required for the plurality of transmissions of the to-be-transmitted data, so that the network device does not need to use DCI to indicate a transmission parameter required for each data transmission. The relationship between the transmission parameters required for the plurality of transmissions of the to-be-transmitted data may be a relationship between hybrid automatic repeat request (HARQ) process sequence numbers used for the plurality of transmissions, or may be a relationship between time-frequency resources used for the plurality of transmissions.

In a possible design of the second aspect, the data transmission method further includes: The network device sends the fourth information to the terminal device. The terminal device may determine the relationship between the transmission parameters required for the plurality of transmissions of the to-be-transmitted data by receiving the fourth information.

In a possible design of the second aspect, the fourth information is used to indicate that the hybrid automatic repeat request (HARQ) process sequence numbers used for the plurality of transmissions are the same. The fourth information may indicate that HARQ process sequence numbers used by the network device for all of the plurality of transmissions of the to-be-transmitted data are the same. Correspondingly, HARQ process sequence numbers used by the terminal device for all of the plurality of transmissions of the to-be-transmitted data are the same.

In a possible design of the second aspect, the fourth information is used to indicate that the HARQ process sequence numbers used for the plurality of transmissions of the to-be-transmitted data are cyclically increasing or cyclically decreasing. In a scenario, the network device in this embodiment transmits the to-be-transmitted data to the terminal device for a plurality of times in different transmission time units by using different beams. Optionally, the network device may transmit the to-be-transmitted data to the terminal device in a plurality of consecutive transmission time units by using different beams. In this scenario, because the network device transmits the to-be-transmitted data to the terminal device in the plurality of consecutive transmission time units by using the different beams, from the perspective of time domain, the data transmissions to the terminal device may correspond to the HARQ process sequence numbers in a specific HARQ process sequence number order. Specifically, the data transmissions to the terminal device may correspond to the HARQ process sequence numbers in a specific HARQ process sequence number order in the plurality of consecutive transmission time units.

In a possible design of the second aspect, the data transmission method further includes: The network device receives acknowledgment (ACK) feedback information sent by the terminal device; and the network device releases all HARQ processes used for the plurality of transmissions. When the fourth information indicates that the HARQ process sequence numbers used for the plurality of transmissions of the to-be-transmitted data are cyclically increasing or cyclically decreasing, it is equivalent to that the HARQ process sequence numbers used by the network device for the plurality of transmissions are different. If the terminal device successfully receives the to-be-transmitted data once, the terminal device feeds back ACK information to the network device. After receiving the ACK information, the network device releases the processes corresponding to all the HARQ process sequence numbers used for the plurality of transmissions. It should be noted that only one piece of ACK/NACK information is fed back for one HARQ process, and accordingly a plurality of pieces of ACK/NACK information are fed back for a plurality of HARQ processes. In a multi-beam polling scenario, the network device uses different beams to perform data transmissions. If different HARQ processes are allocated for all the data transmissions, because one piece of ACK/NACK information may be obtained for each HARQ process, one piece of ACK/NACK information may be obtained for each data transmission, in other words, one piece of corresponding ACK/NACK information may be obtained for each beam. This implements link adaptation for each beam and improves multi-beam transmission performance.

In a possible design of the second aspect, the fourth information is used to indicate a relationship between the time-frequency resources used for the plurality of transmissions. Optionally, the fourth information is used to indicate at least one of the following information: a time-domain start position interval used for the plurality of transmissions, a time-domain end position interval used for the plurality of transmissions, a frequency-domain start position interval used for the plurality of transmissions, and a frequency-domain end position interval used for the plurality of transmissions. In this scenario, from the perspective of time domain, if the network device performs one data transmission in each transmission time unit, each transmission time unit includes one time-domain start position, and an interval between time-domain start positions of two adjacent transmission time units is a time-domain start position interval. In this scenario, from the perspective of frequency domain, each data transmission performed by the network device includes one frequency-domain start position, and an interval between frequency-domain start positions of adjacent transmission time units is a frequency-domain start position interval. It should be noted that, in this scenario, from the perspective of time domain, if the network device performs one data transmission in each transmission time unit, each transmission time unit may also include one time-domain end position, and an interval between time-domain end positions of two adjacent transmission time units is a time-domain end position interval. In this scenario, from the perspective of frequency domain, each data transmission performed by the network device includes one frequency-domain end position, and an interval between frequency-domain end positions of adjacent transmission time units is a frequency-domain end position interval.

In a possible design of the second aspect, the fourth information includes a time-domain start position interval set used for the plurality of transmissions, and the time-domain start position interval set includes a plurality of time-domain start position intervals.

In a possible design of the second aspect, the data transmission method further includes: The network device sends fifth information to the terminal device, where the fifth information includes a target time-domain start position interval, and the target time-domain start position interval belongs to the time-domain start position interval set. The fourth information may indicate that the plurality of time-domain start position intervals are used as "alternatives" of the time domain resources of the network device. When sending the to-be-transmitted data for a plurality of times, the network device may determine one of the plurality of time-domain start position intervals as the target time-domain start position interval, and send the to-be-transmitted data to the terminal device for a plurality of times every one target time-domain start position interval in time domain.

In a possible design of the second aspect, the fourth information includes a frequency-domain start position interval set used for the plurality of transmissions of the to-be-transmitted data, and the frequency-domain start position interval set includes a plurality of frequency-domain start position intervals.

In a possible design of the second aspect, the data transmission method further includes: The network device sends sixth information to the terminal device, where the sixth information includes a target frequency-domain start position interval, and the target frequency-domain start position interval belongs to the frequency-domain start position interval set.

In a possible design of the second aspect, the fourth information, the fifth information, and the sixth information are encapsulated in either or both of the following information: a media access control control element (MAC CE) and a physical downlink control channel (PDCCH).

According to a third aspect, an embodiment of this application provides a data transmission method. The method includes: A terminal device receives first information sent by a network device, where the first information is used to indicate transmission parameters required for a plurality of transmissions of to-be-transmitted data; the terminal device obtains the first information; and the terminal device receives, based on the first information, the to-be-transmitted data sent by the network device for a plurality of times. For a method in which the first information indicates the transmission parameters required for the plurality of transmissions of the to-be-transmitted data, refer to the descriptions in the foregoing embodiment. Details are not described herein again.

In a possible design of the third aspect, the first information includes a transmission configuration indicator (TCI) set, the TCI set includes a plurality of TCIs, and TCIs used for the plurality of transmissions belong to the TCI set.

In a possible design of the third aspect, the data transmission method further includes: The terminal device receives second information sent by the network device, where the second information is used to indicate a target TCI subset, and the target TCI subset is a subset of the TCI set.

In a possible design of the third aspect, the data transmission method further includes: The terminal device determines third information, where the third information is used to indicate to traverse the TCI set in a first order to obtain the TCIs used for the plurality of transmissions, and the first order includes a cyclic ascending order of numbers of the TCIs in the TCI set, or a cyclic descending order of numbers of the TCIs in the TCI set, or an order of the TCIs in the TCI set. The terminal device may determine the third information by using a protocol.

In a possible design of the third aspect, the data transmission method further includes: The terminal device receives the third information sent by the network device.

In a possible design of the third aspect, the first information includes an identifier of the network device that transmits the to-be-transmitted data. Optionally, the identifier of the network device is associated with at least one TCI in the TCI set.

In a possible design of the third aspect, the first information and the third information are encapsulated in radio resource control (RRC).

In a possible design of the third aspect, the second information is encapsulated in either or both of the following information: a media access control control element (MAC CE) and a physical downlink control channel (PDCCH).

According to a fourth aspect, an embodiment of this application provides a data transmission method. The method includes: A terminal device obtains fourth information, where the fourth information is used to indicate a relationship between transmission parameters required for a plurality of transmissions of to-be-transmitted data; and the terminal device receives, based on the fourth information, the to-be-transmitted data sent by a network device for a plurality of times. For a method in which the fourth information indicates the relationship between the transmission parameters required for the plurality of transmissions of the to-be-transmitted data, refer to the descriptions in the foregoing embodiment. Details are not described herein again.

In a possible design of the fourth aspect, that a terminal device obtains fourth information includes: The terminal device receives the fourth information sent by the network device.

In a possible design of the fourth aspect, the fourth information is used to indicate that hybrid automatic repeat request (HARQ) process sequence numbers used for the plurality of transmissions are the same.

In a possible design of the fourth aspect, the fourth information is used to indicate that the HARQ process sequence numbers used for the plurality of transmissions of the to-be-transmitted data are ascending or descending.

In a possible design of the fourth aspect, the method further includes: The terminal device sends acknowledgment (ACK) feedback information to the network device, so that the network device releases all HARQ processes used for the plurality of transmissions.

In a possible design of the fourth aspect, the fourth information is used to indicate a relationship between time-frequency resources used for the plurality of transmissions.

In a possible design of the fourth aspect, the fourth information is used to indicate at least one of the following information: a time-domain start position interval used for the plurality of transmissions, a time-domain end position interval used for the plurality of transmissions, a frequency-domain start position interval used for the plurality of transmissions, and a frequency-domain end position interval used for the plurality of transmissions.

In a possible design of the fourth aspect, the fourth information includes a time-domain start position interval set used for the plurality of transmissions, and the time-domain start position interval set includes a plurality of time-domain start position intervals.

In a possible design of the fourth aspect, the data transmission method further includes: The terminal device receives fifth information sent by the network device, where the fifth information includes a target time-domain start position interval, and the target time-domain start position interval belongs to the time-domain start position interval set.

In a possible design of the fourth aspect, the fourth information includes a frequency-domain start position interval set used for the plurality of transmissions of the to-be-transmitted data, and the frequency-domain start position interval set includes a plurality of frequency-domain start position intervals.

In a possible design of the fourth aspect, the data transmission method further includes: The terminal device receives sixth information sent by the network device, where the sixth information includes a target frequency-domain start position interval, and the target frequency-domain start position interval belongs to the frequency-domain start position interval set.

In a possible design of the fourth aspect, the fourth information, the fifth information, and the sixth information are encapsulated in either or both of the following information: a media access control control element (MAC CE) and a physical downlink control channel (PDCCH).

According to a fifth aspect, an embodiment of this application provides a data transmission method. The method includes: A network device determines seventh information, where the seventh information is used to indicate transmission parameters required for a plurality of transmissions of to-be-transmitted data; the network device sends the seventh information to a terminal device; and the network device receives the to-be-transmitted data sent by the terminal device for a plurality of times based on the seventh information.

In a possible design of the fifth aspect, the seventh information includes a sounding reference signal resource indicator (SRI) set, the SRI set includes a plurality of SRIs, and SRIs used for the plurality of transmissions belong to the SRI set.

In a possible design of the fifth aspect, the method further includes: The network device sends eighth information to the terminal device, where the eighth information is used to indicate a target SRI subset, and the target SRI subset is a subset of the SRI set.

In a possible design of the fifth aspect, the seventh information includes an identifier of the network device that receives the to-be-transmitted data.

In a possible design of the fifth aspect, the identifier of the network device is associated with at least one SRI in the SRI set.

In a possible design of the fifth aspect, the seventh information is used to indicate that hybrid automatic repeat request (HARQ) process sequence numbers used for the plurality of uplink transmissions are the same.

In a possible design of the fifth aspect, the seventh information is used to indicate that HARQ process sequence numbers used for the plurality of uplink transmissions of the to-be-transmitted data are cyclically increasing or cyclically decreasing.

In a possible design of the fifth aspect, the seventh information is used to indicate at least one of the following information: a time-domain start position interval used for the plurality of uplink transmissions, a time-domain end position interval used for the plurality of uplink transmissions, a frequency-domain start position interval used for the plurality of uplink transmissions, and a frequency-domain end position interval used for the plurality of uplink transmissions.

According to a sixth aspect, an embodiment of this application provides a data transmission method. The method includes: A terminal device receives seventh information, where the seventh information is used to indicate transmission parameters required for a plurality of transmissions of to-be-transmitted data; the terminal device obtains the seventh information; and the terminal device sends the to-be-transmitted data to a network device for a plurality of times based on the seventh information.

In a possible design of the sixth aspect, the seventh information includes a sounding reference signal resource indicator (SRI) set, the SRI set includes a plurality of SRIs, and SRIs used for the plurality of transmissions belong to the SRI set.

In a possible design of the sixth aspect, the method further includes: The terminal device receives eighth information sent by the network device, where the eighth information is used to indicate a target SRI subset, and the target SRI subset is a subset of the SRI set.

In a possible design of the sixth aspect, the seventh information includes an identifier of the network device that receives the to-be-transmitted data.

In a possible design of the sixth aspect, the identifier of the network device is associated with at least one SRI in the SRI set.

In a possible design of the sixth aspect, the seventh information is used to indicate that hybrid automatic repeat request (HARQ) process sequence numbers used for the plurality of uplink transmissions are the same.

In a possible design of the sixth aspect, the seventh information is used to indicate that HARQ process sequence numbers used for the plurality of uplink transmissions of the to-be-transmitted data are cyclically increasing or cyclically decreasing.

In a possible design of the sixth aspect, the seventh information is used to indicate at least one of the following information: a time-domain start position interval used for the plurality of uplink transmissions, a time-domain end position interval used for the plurality of uplink transmissions, a frequency-domain start position interval used for the plurality of uplink transmissions, and a frequency-domain end position interval used for the plurality of uplink transmissions.

In a possible design of the fifth aspect or the sixth aspect, the seventh information is encapsulated in radio resource control (RRC).

In a possible design of the fifth aspect or the sixth aspect, the eighth information is encapsulated in either or both of the following information: a media access control control element (MAC CE) and a physical downlink control channel (PDCCH).

A seventh aspect of this application provides a network device. The network device includes: a processing module, configured to determine first information, where the first information is used to indicate transmission parameters required for a plurality of transmissions of to-be-transmitted data; and a sending module, configured to send the first information determined by the processing module to a terminal device. The sending module is further configured to send the to-be-transmitted data to the terminal device for a plurality of times based on the first information.

In a possible design of the seventh aspect, the first information includes a transmission configuration indicator (TCI) set, the TCI set includes a plurality of TCIs, and TCIs used for the plurality of transmissions belong to the TCI set.

In a possible design of the seventh aspect, the sending module is further configured to send second information to the terminal device, where the second information is used to indicate a target TCI subset, and the target TCI subset is a subset of the TCI set.

In a possible design of the seventh aspect, the processing module is further configured to determine third information, where the third information is used to indicate to traverse the TCI set in a first order to obtain the TCIs used for the plurality of transmissions, and the first order includes a cyclic ascending order of numbers of the TCIs in the TCI set, or a cyclic descending order of numbers of the TCIs in the TCI set, or an order of the TCIs in the TCI set.

In a possible design of the seventh aspect, the sending module is further configured to send the third information to the terminal device.

In a possible design of the seventh aspect, the first information includes an identifier of the network device that transmits the to-be-transmitted data.

In a possible design of the seventh aspect, the identifier of the network device is associated with at least one TCI in the TCI set.

In a possible design of the seventh aspect, the first information and the third information are encapsulated in radio resource control (RRC).

In a possible design of the seventh aspect, the second information is encapsulated in either or both of the following information: a media access control control element (MAC CE) and a physical downlink control channel (PDCCH).

According to an eighth aspect, an embodiment of this application further provides a network device. The network device includes: a processing module, configured to determine fourth information, where the fourth information is used to indicate a relationship between transmission parameters required for a plurality of transmissions of to-be-transmitted data; and a sending module, configured to send the to-be-transmitted data to a terminal device for a plurality of times based on the fourth information determined by the processing module.

In a possible design of the eighth aspect, the sending module is further configured to send the fourth information determined by the processing module to the terminal device.

In a possible design of the eighth aspect, the fourth information is used to indicate that hybrid automatic repeat request (HARQ) process sequence numbers used for the plurality of transmissions are the same.

In a possible design of the eighth aspect, the fourth information is used to indicate that HARQ process sequence numbers used for the plurality of transmissions of the to-be-transmitted data are cyclically increasing or cyclically decreasing.

In a possible design of the eighth aspect, the network device further includes a receiving module, configured to receive acknowledgment (ACK) feedback information sent by the terminal device. The processing module is further configured to release all HARQ processes used for the plurality of transmissions.

In a possible design of the eighth aspect, the fourth information is used to indicate a relationship between time-frequency resources used for the plurality of transmissions.

In a possible design of the eighth aspect, the fourth information is used to indicate at least one of the following information: a time-domain start position interval used for the plurality of transmissions, a time-domain end position interval used for the plurality of transmissions, a frequency-domain start position interval used for the plurality of transmissions, and a frequency-domain end position interval used for the plurality of transmissions.

In a possible design of the eighth aspect, the fourth information includes a time-domain start position interval set used for the plurality of transmissions, and the time-domain start position interval set includes a plurality of time-domain start position intervals.

In a possible design of the eighth aspect, the sending module is further configured to send fifth information to the terminal device, where the fifth information includes a target time-domain start position interval, and the target time-domain start position interval belongs to the time-domain start position interval set.

In a possible design of the eighth aspect, the fourth information includes a frequency-domain start position interval set used for the plurality of transmissions of the to-be-transmitted data, and the frequency-domain start position interval set includes a plurality of frequency-domain start position intervals.

In a possible design of the eighth aspect, the sending module is further configured to send sixth information to the terminal device, where the sixth information includes a target frequency-domain start position interval, and the target frequency-domain start position interval belongs to the frequency-domain start position interval set.

In a possible design of the eighth aspect, the fourth information, the fifth information, and the sixth information are encapsulated in either or both of the following information: a media access control control element (MAC CE) and a physical downlink control channel (PDCCH).

According to a ninth aspect, an embodiment of this application further provides a terminal device. The terminal device includes: a receiving module, configured to receive first information sent by the network device, where the first information is used to indicate transmission parameters required for a plurality of transmissions of to-be-transmitted data; and a processing module, configured to obtain the first information. The receiving module is further configured to receive, based on the first information, the to-be-transmitted data sent by the network device for a plurality of times.

In a possible design of the ninth aspect, the first information includes a transmission configuration indicator (TCI) set, the TCI set includes a plurality of TCIs, and TCIs used for the plurality of transmissions belong to the TCI set.

In a possible design of the ninth aspect, the receiving module is further configured to receive second information sent by the network device, where the second information is used to indicate a target TCI subset, and the target TCI subset is a subset of the TCI set.

In a possible design of the ninth aspect, the processing module is further configured to determine third information, where the third information is used to indicate to traverse the TCI set in a first order to obtain the TCIs used for the plurality of transmissions, and the first order includes a cyclic ascending order of numbers of the TCIs in the TCI set, or a cyclic descending order of numbers of the TCIs in the TCI set, or an order of the TCIs in the TCI set.

In a possible design of the ninth aspect, the receiving module is further configured to receive the third information sent by the network device.

In a possible design of the ninth aspect, the first information includes an identifier of the network device that transmits the to-be-transmitted data.

In a possible design of the ninth aspect, the identifier of the network device is associated with at least one TCI in the TCI set.

In a possible design of the ninth aspect, the first information and the third information are encapsulated in radio resource control (RRC).

In a possible design of the ninth aspect, the second information is encapsulated in either or both of the following information: a media access control control element (MAC CE) and a physical downlink control channel (PDCCH).

According to a tenth aspect, an embodiment of this application further provides a terminal device. The terminal device includes: a processing module, configured to determine fourth information; and a receiving module, configured to receive to-be-transmitted data sent by a network device for a plurality of times based on the fourth information, where the fourth information is determined by the terminal device, and the fourth information is used to indicate a relationship between transmission parameters required for a plurality of transmissions of the to-be-transmitted data.

In a possible design of the tenth aspect, the receiving module is further configured to receive the fourth information sent by the network device.

In a possible design of the tenth aspect, the fourth information is used to indicate that hybrid automatic repeat request (HARQ) process sequence numbers used for the plurality of transmissions are the same.

In a possible design of the tenth aspect, the fourth information is used to indicate that HARQ process sequence numbers used for the plurality of transmissions of the to-be-transmitted data are ascending or descending.

In a possible design of the tenth aspect, the terminal device further includes a sending module, configured to send acknowledgment (ACK) feedback information to the network device, so that the network device releases all HARQ processes used for the plurality of transmissions.

In a possible design of the tenth aspect, the fourth information is used to indicate a relationship between time-frequency resources used for the plurality of transmissions.

In a possible design of the tenth aspect, the fourth information is used to indicate at least one of the following information: a time-domain start position interval used for the plurality of transmissions, a time-domain end position interval used for the plurality of transmissions, a frequency-domain start position interval used for the plurality of transmissions, and a frequency-domain end position interval used for the plurality of transmissions.

In a possible design of the tenth aspect, the fourth information includes a time-domain start position interval set used for the plurality of transmissions, and the time-domain start position interval set includes a plurality of time-domain start position intervals.

In a possible design of the tenth aspect, the receiving module is further configured to receive fifth information sent by the network device, where the fifth information includes a target time-domain start position interval, and the target time-domain start position interval belongs to the time-domain start position interval set.

In a possible design of the tenth aspect, the fourth information includes a frequency-domain start position interval set used for the plurality of transmissions of the to-be-transmitted data, and the frequency-domain start position interval set includes a plurality of frequency-domain start position intervals.

In a possible design of the tenth aspect, the receiving module is further configured to receive sixth information sent by the network device, where the sixth information includes a target frequency-domain start position interval, and the target frequency-domain start position interval belongs to the frequency-domain start position interval set.

In a possible design of the tenth aspect, the fourth information, the fifth information, and the sixth information are encapsulated in either or both of the following information: a media access control control element (MAC CE) and a physical downlink control channel (PDCCH).

According to an eleventh aspect, an embodiment of this application further provides a network device. The network device includes: a processing module, configured to determine seventh information, where the seventh information is used to indicate transmission parameters required for a plurality of transmissions of to-be-transmitted data; a sending module, configured to send the seventh information to a terminal device; and a receiving module, configured to receive the to-be-transmitted data sent by the terminal device for a plurality of times based on the first information.

In a possible design of the eleventh aspect, the seventh information includes a sounding reference signal resource indicator (SRI) set, the SRI set includes a plurality of SRIs, and SRIs used for the plurality of transmissions belong to the SRI set.

In a possible design of the eleventh aspect, the sending module is further configured to send eighth information to the terminal device, where the eighth information is used to indicate a target SRI subset, and the target SRI subset is a subset of the SRI set.

In a possible design of the eleventh aspect, the seventh information includes an identifier of the network device that receives the to-be-transmitted data.

In a possible design of the eleventh aspect, the identifier of the network device is associated with at least one SRI in the SRI set.

In a possible design of the eleventh aspect, the seventh information is used to indicate that hybrid automatic repeat request (HARQ) process sequence numbers used for the plurality of uplink transmissions are the same.

In a possible design of the eleventh aspect, the seventh information is used to indicate that HARQ process sequence numbers used for the plurality of uplink transmissions of the to-be-transmitted data are cyclically increasing or cyclically decreasing.

In a possible design of the eleventh aspect, the seventh information is used to indicate at least one of the following information: a time-domain start position interval used for the plurality of uplink transmissions, a time-domain end position interval used for the plurality of uplink transmissions, a frequency-domain start position interval used for the plurality of uplink transmissions, and a frequency-domain end position interval used for the plurality of uplink transmissions.

According to a twelfth aspect, an embodiment of this application provides a terminal device. The terminal device includes: a receiving module, configured to receive seventh information, where the seventh information is used to indicate transmission parameters required for a plurality of transmissions of to-be-transmitted data; a processing module, configured to obtain the seventh information; and a sending module, configured to send the to-be-transmitted data to a network device for a plurality of times based on the seventh information.

In a possible design of the twelfth aspect, the seventh information includes a sounding reference signal resource indicator (SRI) set, the SRI set includes a plurality of SRIs, and SRIs used for the plurality of transmissions belong to the SRI set.

In a possible design of the twelfth aspect, the receiving module is further configured to receive eighth information sent by the network device, where the eighth information is used to indicate a target SRI subset, and the target SRI subset is a subset of the SRI set.

In a possible design of the twelfth aspect, the seventh information includes an identifier of the network device that receives the to-be-transmitted data.

In a possible design of the twelfth aspect, the identifier of the network device is associated with at least one SRI in the SRI set.

In a possible design of the twelfth aspect, the seventh information is used to indicate that hybrid automatic repeat request (HARQ) process sequence numbers used for the plurality of uplink transmissions are the same.

In a possible design of the twelfth aspect, the seventh information is used to indicate that HARQ process sequence numbers used for the plurality of uplink transmissions of the to-be-transmitted data are cyclically increasing or cyclically decreasing.

In a possible design of the twelfth aspect, the seventh information is used to indicate at least one of the following information: a time-domain start position interval used for the plurality of uplink transmissions, a time-domain end position interval used for the plurality of uplink transmissions, a frequency-domain start position interval used for the plurality of uplink transmissions, and a frequency-domain end position interval used for the plurality of uplink transmissions.

In a possible design of the eleventh aspect or the twelfth aspect, the seventh information is encapsulated in radio resource control (RRC).

In a possible design of the eleventh aspect or the twelfth aspect, the eighth information is encapsulated in either or both of the following information: a media access control control element (MAC CE) and a physical downlink control channel (PDCCH).

The possible designs of the communications device according to the seventh aspect to the twelfth aspect have a same effect as the corresponding possible designs of the method according to any one of the first aspect to the sixth aspect. Details are not described again.

According to a thirteenth aspect, a communications device is provided, and includes a processor and a transceiver. The processor performs the method according to any one of the first aspect to the sixth aspect.

According to a fourteenth aspect, a communications device is provided, and includes a processor and an interface. The processor performs the method according to any one of the first aspect to the sixth aspect.

According to a fifteenth aspect, a communications device is provided, and includes a memory, a processor, and a program that is stored in the memory and that can run on the processor. When the processor executes the program, the method according to any one of the first aspect to the sixth aspect is implemented. It should be noted that the memory may be a nonvolatile memory, or may be a volatile memory. The memory may be located inside the communications device, or may be located outside the communications device.

According to a sixteenth aspect, a communications device is provided. The communications device may use the method according to any one of the first aspect to the sixth aspect. The communications device may be a network device, a terminal device, or hardware that implements a similar function.

According to a seventeenth aspect, a system is provided. The system includes the foregoing terminal device and the foregoing network device.

According to an eighteenth aspect, a computer-readable storage medium is provided and is configured to store a computer program. The computer program includes instructions used to perform the method according to any one of the possible implementations of the first aspect to the sixth aspect.

According to a nineteenth aspect, a computer program product is provided. The computer program product includes computer program code, and when the computer program code is run on a computer, the computer is enabled to perform the method according to any one of the possible implementations of the first aspect to the sixth aspect.

According to the data transmission method in the embodiments of this application, the network device sends the first information to the terminal device before sending the to-be-transmitted data. Because the first information indicates the transmission parameters required for the plurality of transmissions of the to-be-transmitted data, the terminal device may determine, based on the first information, the transmission parameters required for the plurality of transmissions of the to-be-transmitted data, and then receive the to-be-transmitted data for a plurality of times by using the transmission parameters, so that the network device does not need to use DCI to indicate a transmission parameter for each data transmission. This reduces DCI resources, supports more terminals in performing data transmission, and improves cell data transmission performance.

DETAILED DESCRIPTION OF ILLUSTRATIVE EMBODIMENTS

Figure 1A:
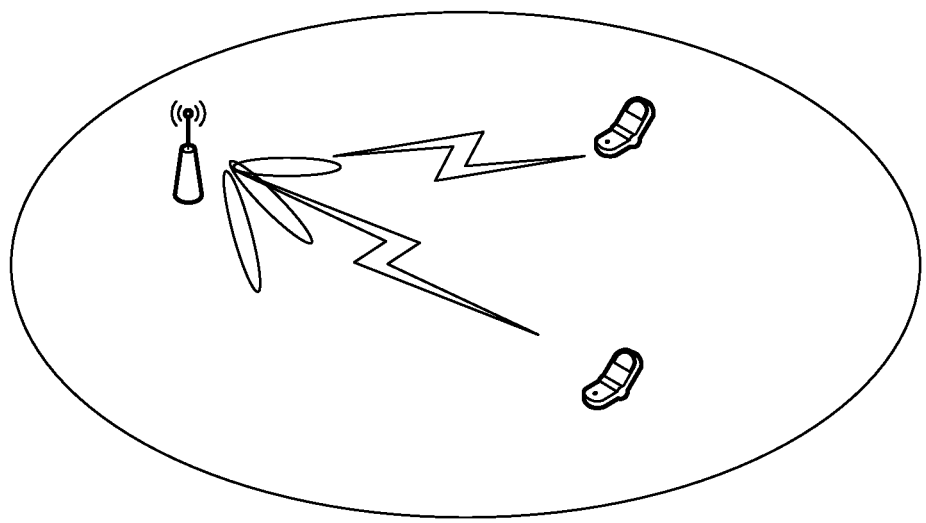
FIG. 1A is a schematic diagram of an embodiment of a communications system according to the embodiments of this application.

This application provides a data transmission method, so that a network device does not need to use DCI to indicate a transmission parameter for each data transmission. This reduces DCI resources and improves cell data transmission performance.

The following describes the technical solutions in the embodiments of this application with reference to the accompanying drawings in the embodiments of this application.

The terms used in the embodiments of this application are merely for the purpose of illustrating specific embodiments, and are not intended to limit this application. The terms "a", "an", and "the" of singular forms used in the embodiments of this application and the appended claims are also intended to include plural forms, unless otherwise specified in the context clearly. It should be further understood that the term "and/or" used in this specification indicates and includes any or all possible combinations of one or more associated items that are listed. The character "/" in this specification generally indicates an "or" relationship between the associated objects.

It should be understood that, although terms "first", "second", "third", and the like may be used in the embodiments of this application to describe various packets/frames, requests, and terminals, the packets/frames, requests, and terminals are not limited by the terms. These terms are merely used to distinguish between the packets/frames, requests, and terminals. For example, without departing from the scope of the embodiments of this application, a first terminal may also be referred to as a second terminal, and similarly, a second terminal may also be referred to as a first terminal.

Depending on the context, for example, words "if" used herein may be explained as "while", or "when", or "in response to determining", or "in response to detecting". Similarly, depending on the context, phrases "if determining" or "if detecting (a stated condition or event)" may be explained as "when determining", or "in response to determining", or "when detecting (the stated condition or event)", or "in response to detecting (the stated condition or event)".

It should be understood that this application relates to a noun "beam". It may be understood that one beam may include one or more antenna ports, configured to transmit a data channel, a control channel, a sounding signal, and the like. For example, a transmit beam may be signal strength distribution formed in different directions in space after a signal is transmitted by an antenna, and a receive beam may be signal strength distribution formed in different directions in space after a radio signal is received from an antenna. The one or more antenna ports forming the one beam may also be considered as one antenna port set.

It should be understood that this application relates to a noun "transmission time unit". It may be understood that the transmission time unit may be a transmission time interval (TTI) in an LTE system, or may be a slot, a time domain symbol, a mini slot including one or more time domain symbols, a time unit including a plurality of slots, a time unit including a plurality of mini slots, or the like in a subsequently evolved communications system (for example, a new radio (NR) system) in an LTE system. The time domain symbol may be an orthogonal frequency division multiplexing (OFDM) symbol, or may be a single-carrier frequency division multiple access (SC-FDMA) symbol.

It should be understood that this application relates to a noun "same data". It may be understood that the same data may be a same HARQ redundancy version (RV) or different HARQ redundancy versions of a same codeword generated by encoding a same data transport block, or may be HARQ redundancy versions with a same number or different numbers corresponding to different codewords generated by independently encoding a same data transport block (TB).

The following describes a communications system to which this application is applied. FIG. 1A is a schematic diagram of an embodiment of a communications system according to the embodiments of this application.

As shown in FIG. 1A, the communications system includes a network device and a terminal device.

In this embodiment of this application, the network device is an apparatus that is deployed in a radio access network to provide a wireless communication function for the terminal device. The network device may include a macro base station, a micro base station (also referred to as a small cell), a relay node, an access point, and the like in various forms. A device having a base station function may be named differently in systems using different radio access technologies. For example, the device is referred to as an evolved NodeB (eNB or eNodeB) in an LTE system, or a NodeB in a 3rd generation (3G) system, or a wireless network access device in a 5th generation (5G) system. For ease of description, in all the embodiments of this application, the foregoing apparatuses that provide a wireless communication function for the terminal device are collectively referred to as the network device, or a base station, or a BS.

The terminal device in this embodiment of this application may include various handheld devices, vehicle-mounted devices, wearable devices, or computing devices that have a wireless communication function, or other processing devices connected to a wireless modem. The terminal device may be a mobile station (MS), a subscriber unit, a cellular phone, a smartphone, a wireless data card, a personal digital assistant (PDA) computer, a tablet computer, a wireless modem, a handheld device, a laptop computer, a machine type communication (MTC) terminal, or the like.

FIG. 1A shows a scenario in which one network device schedules transmission control information to a plurality of terminal devices. Actually, a plurality of network devices may schedule transmission control information to one terminal device, as shown in FIG. 1B.

Figure 1B:
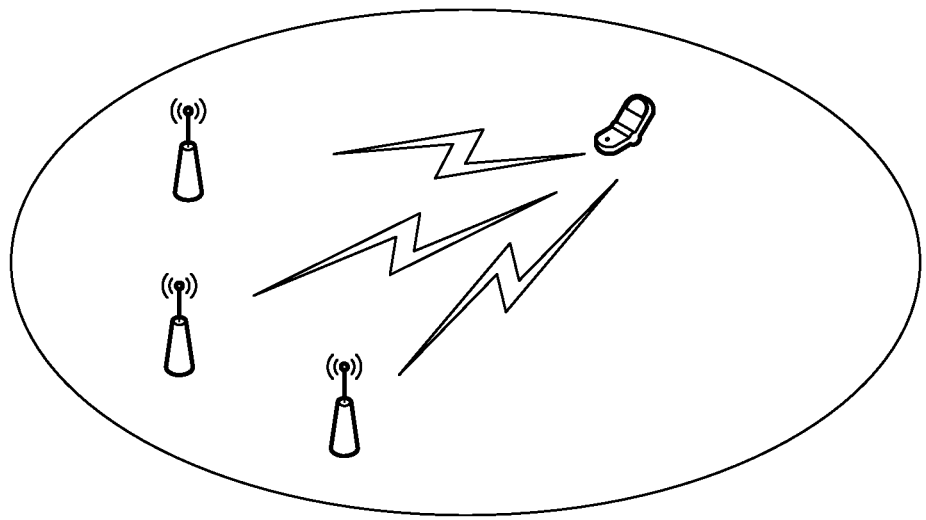
FIG. 1B is a schematic diagram of an embodiment of a communications system according to the embodiments of this application.
Figure 2:
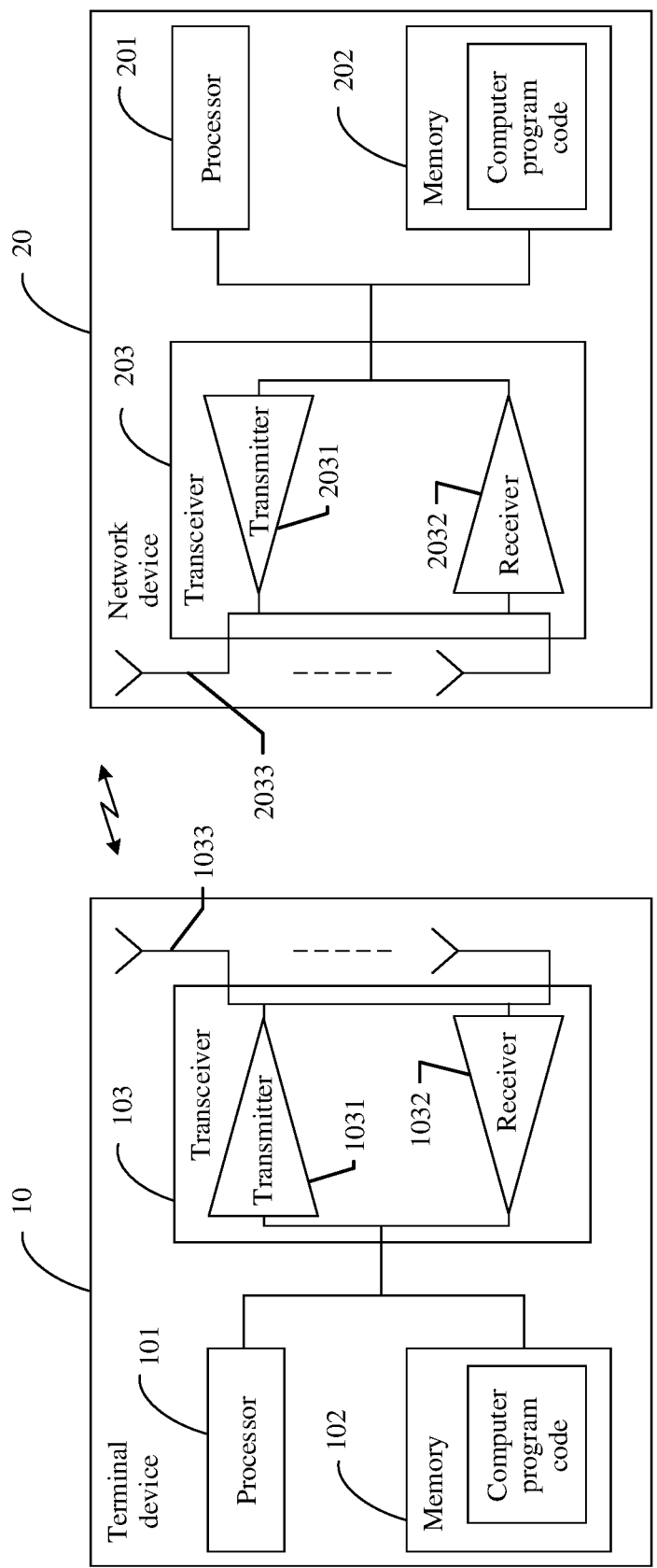
FIG. 2 is a schematic diagram of another embodiment of a communications system according to the embodiments of this application.

Communication between each network device and each terminal device in the communications systems shown in FIG. 1A and FIG. 1B may also be represented in another form. As shown in FIG. 2, a terminal device 10 includes a processor 101, a memory 102, and a transceiver 103. The transceiver 103 includes a transmitter 1031, a receiver 1032, and an antenna 1033. A network device 20 includes a processor 201, a memory 202, and a transceiver 203. The transceiver 203 includes a transmitter 2031, a receiver 2032, and an antenna 2033. The receiver 1032 may be configured to receive transmission control information through the antenna 1033, and the transmitter 1031 may be configured to send transmission feedback information to the network device 20 through the antenna 1033. The transmitter 2031 may be configured to send transmission control information to the terminal device 10 through the antenna 2033, and the receiver 2032 may be configured to receive, through the antenna 2033, transmission feedback information sent by the terminal device 10.

The foregoing describes the structures of the communications system, the terminal device, and the network device. The following describes data transmission between the terminal device and the network device.

Figure 3:
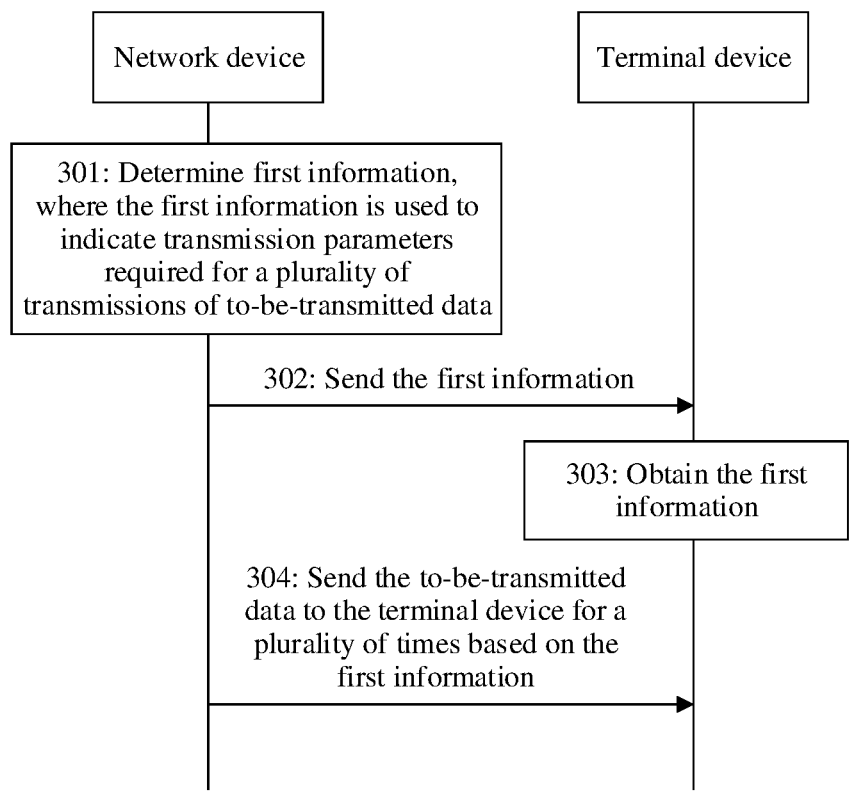
FIG. 3 is a schematic diagram of an embodiment of a data transmission method according to the embodiments of this application.

As shown in FIG. 3, an embodiment of a data transmission method provided in the embodiments of this application includes the following steps.

301: A network device determines first information, where the first information is used to indicate transmission parameters required for a plurality of transmissions of to-be-transmitted data.

In this embodiment of this application, in a scenario, the network device may transmit the to-be-transmitted data to a terminal device for a plurality of times in different transmission time units by using different beams. Further, the network device may transmit the to-be-transmitted data to the terminal device for a plurality of times in different transmission time units by using different beams and different antenna ports. In addition, the network device needs to indicate, to the terminal device, a transmission parameter required for each of the plurality of data transmissions, so that the terminal device can receive, by using the transmission parameter indicated by the network device, the to-be-transmitted data sent by the network device each time. It should be understood that the to-be-transmitted data may be a same HARQ redundancy version (RV) or different HARQ redundancy versions of a same codeword generated by encoding a same data transport block, or may be HARQ redundancy versions with a same number or different numbers of different codewords generated by independently encoding a same TB. This is not limited herein.

In this embodiment of this application, the network device may determine the first information before indicating, to the terminal device, the transmission parameter for each of the plurality of data transmissions. The first information is used to indicate the transmission parameters required for the plurality of transmissions of the to-be-transmitted data. The network device may send the first information to the terminal device to indicate, to the terminal device, the transmission parameter for each of the plurality of data transmissions, so that the terminal device can receive, by using the transmission parameter indicated by the network device, the to-be-transmitted data sent by the network device each time. In addition, the network device may send the to-be-transmitted data to the terminal device for a plurality of times based on the transmission parameters indicated by the first information.

302: The network device sends the first information to the terminal device.

In this embodiment of this application, the network device sends the first information to the terminal device to indicate, to the terminal device, the transmission parameters required for the plurality of transmissions; and the terminal device may receive the first information sent by the network device. The first information is used to indicate the transmission parameters required for the plurality of transmissions of the to-be-transmitted data.

In this embodiment of this application, the network device may send the first information to the terminal device by using radio resource control (RRC) signaling, for example, may configure the first information in the RRC signaling; and the terminal device may receive, by using the RRC signaling, the first information sent by the network device.

303: The terminal device obtains the first information.

In this embodiment of this application, the terminal device may obtain the first information by receiving the first information sent by the network device, so that the terminal device can obtain the transmission parameters required for the plurality of transmissions. Compared with a solution in which DCI carrying a transmission parameter needs to be used during each data transmission in a plurality of transmissions, in this embodiment of this application, the network device sends the first information to the terminal device, and the first information may indicate the transmission parameters required for the plurality of transmissions of the to-be-transmitted data, so that the network device does not need to use DCI to indicate a transmission parameter for each data transmission.

In an embodiment, the first information may include a transmission configuration indicator (TCI) set, the TCI set includes a plurality of TCIs, and TCIs used for the plurality of transmissions belong to the TCI set. In this embodiment, each TCI number may indicate one piece of beam information. That the network device sends the first information to the terminal device is equivalent to indicating, to the terminal device, beam information corresponding to the plurality of transmissions. After obtaining the first information, the terminal device may learn of the beam information required for the plurality of transmissions. In this embodiment, each TCI may correspond to one of the plurality of transmissions of the to-be-transmitted data, and each TCI number may indicate beam information corresponding to the one transmission. After obtaining the TCI set based on the first information, the terminal device may determine, based on a correspondence between a TCI number and each transmission of the to-be-transmitted data, beam information corresponding to each transmission, and then receive, by using a beam corresponding to the beam information, the to-be-transmitted data sent by the network device for a specific time.

In an embodiment, each TCI number may indicate one reference signal antenna port, each reference signal antenna port corresponds to one of the plurality of transmissions of the to-be-transmitted data, and the reference signal antenna port has a quasi-co-location (QCL) relationship with one piece of beam information. Specifically, after obtaining the TCI set based on the first information, the terminal device may determine, based on the correspondence between a TCI number and each transmission of the to-be-transmitted data, a reference signal antenna port corresponding to each transmission. Because the reference signal antenna port has the quasi-co-location (QCL) relationship with the piece of beam information, the terminal device may determine the beam information corresponding to each transmission, and receive, by using a beam corresponding to the beam information, the to-be-transmitted data sent by the network device for a specific time.

It should be understood that the reference signal antenna port in this embodiment of this application may be a synchronization signal physical broadcast channel block (SS-PBCH block) antenna port, a channel state information reference signal (CSI-RS) antenna port, a sounding reference signal (SRS) antenna port, or another reference signal antenna port. This is not limited herein.

In this embodiment, it should be noted that, as shown in FIG. 1B, in another scenario, a plurality of network devices schedule transmission control information to one terminal device. In this scenario, the first information may further include an identifier of a network device that transmits the to-be-transmitted data. In other words, in addition to indicating a beam used for each transmission, the first information further needs to indicate a specific network device that sends the beam used for each transmission. Specifically, each TCI in the TCI set may be associated with one network device. It should be noted that, in this scenario, a quantity of network devices may be less than a quantity of TCIs used for the plurality of transmissions. In the first information, an identifier of a network device may be associated with at least one TCI in the TCI set. In other words, one network device may be associated with a plurality of TCIs.

In this embodiment, optionally, the first information may further include a quantity of network devices that transmit the to-be-transmitted data to the terminal device.

In this embodiment, optionally, the network device may further send second information to the terminal device, where the second information is used to indicate a target TCI subset, and the target TCI subset is a subset of the TCI set. Further, each TCI in the target TCI subset corresponds to one of the plurality of transmissions of the to-be-transmitted data.

In this embodiment, the network device may send the second information to the terminal device to indicate the terminal device to use one TCI subset of the TCI set as the transmission parameters required for the plurality of transmissions. The TCI subset includes at least one TCI, and each TCI number in the TCI subset corresponds to one of the plurality of transmissions of the to-be-transmitted data. After receiving the TCI subset, the terminal device may determine, based on a correspondence between a TCI number in the TCI subset and each transmission of the to-be-transmitted data, beam information corresponding to each transmission, and then receive, by using a beam corresponding to the beam information, the to-be-transmitted data sent by the network device for a specific time. In this embodiment, it is equivalent to that the first information indicates one TCI set. Before the network device sends the to-be-transmitted data to the terminal device for a plurality of times, the network device may further send one piece of second information to the terminal device to indicate the terminal device to use one TCI subset of the TCI set as the transmission parameters required for the plurality of transmissions. For example, the TCI set included in the first information may be {TCI 1, TCI 2, TCI 3, TCI 4, TCI 5, TCI 6, TCI 7, TCI 8, TCI 9}, and the target TCI subset indicated by the second information may be {TCI 1, TCI 2, TCI 3, TCI 4}. In this case, after receiving the second information, the terminal device may determine that each TCI in the target TCI subset {TCI 1, TCI 2, TCI 3, TCI 4} corresponds to one of the plurality of transmissions of the to-be-transmitted data. In this embodiment, the network device sends, to the terminal device, the second information indicating the target TCI subset, so that the network device can indicate, according to an actual requirement, the terminal device to use the target TCI subset of the TCI set as the transmission parameters required for the plurality of transmissions. This improves flexibility of the solution.

In this embodiment, optionally, the network device may send the second information to the terminal device through a media access control control element (MAC CE) or a physical downlink control channel (PDCCH).

Optionally, the first information may further indicate a quantity of times of transmitting the to-be-transmitted data. For example, if the first information indicates that the quantity of times of transmitting the to-be-transmitted data is 6, the network device may send the to-be-transmitted data to the terminal device in six consecutive transmission time units.

The foregoing describes how the network device sends the first information to the terminal device to indicate the transmission parameters required for the plurality of transmissions of the to-be-transmitted data, where the transmission parameter may be specifically a TCI. The following describes how the network device indicates a relationship between each transmission of the to-be-transmitted data and a TCI.

In this embodiment, from the perspective of time domain, the data transmissions performed by the network device may correspond to the TCIs in a specific TCI number order. In this embodiment, the network device may further determine third information, where the third information may indicate to traverse the TCI set in a first order to obtain the TCIs used for the plurality of transmissions. For the network device, the network device may traverse the TCI set in the first order to obtain the TCIs used for the plurality of transmissions, and send the to-be-transmitted data to the terminal device for a plurality of times by using the TCIs obtained through traversal. It should be noted that, if the network device further sends the second information to the terminal device, and the second information is used to indicate the target TCI subset, the third information is used to indicate to traverse the target TCI subset in the first order to obtain the TCIs used for the plurality of transmissions.

In a scenario, the network device may transmit the to-be-transmitted data to the terminal device for a plurality of times in different transmission time units. In this case, the third information may indicate to traverse the TCI set or the target TCI subset in the first order in the different transmission time units to obtain the TCIs used for the plurality of transmissions.

In a scenario, the network device may transmit the to-be-transmitted data to the terminal device for a plurality of times in different transmission time units by using different beams and different antenna ports. In this case, the third information may be used to indicate to traverse the TCI set or the target TCI subset in the first order in the different transmission time units and the different antenna ports to obtain the TCIs used for the plurality of transmissions. The different transmission time units may be a plurality of adjacent or non-adjacent transmission time units. The antenna ports may be arranged in ascending order of numbers, in descending order of numbers, or in another order.

In this embodiment of this application, the first order may include but is not limited to the following several orders.

1. Cyclic Ascending Order of Numbers of the TCIs in the TCI Set or the Target TCI Subset.

The first order may be the cyclic ascending order of the numbers of the TCIs in the TCI set or the target TCI subset. The TCI numbers included in the TCI set or the target TCI subset may be strictly increasing. For example, the TCI set may be {TCI 1, TCI 2, TCI 3, TCI 4, TCI 5, TCI 6, TCI 7, TCI 8, TCI 9}. Specifically, the first order may indicate that a TCI number used for a current data transmission is a TCI number used for a data transmission in a previous transmission time unit plus k, where k is a positive integer. In an embodiment, the network device may further determine a TCI number used for the first transmission in the plurality of transmissions of the to-be-transmitted data.

In this embodiment, optionally, k is equal to 1. For example, if the TCI set is {TCI 1, TCI 2, TCI 3, TCI 4, TCI 5, TCI 6, TCI 7, TCI 8, TCI 9}, the first order indicates a cyclic ascending order of the TCIs in the TCI set, and the interval k is equal to 1. If the network device determines that the TCI number used for the first transmission in the plurality of transmissions of the to-be-transmitted data is the TCI 3, the network device may determine that TCIs used to transmit the to-be-transmitted data in a plurality of consecutive transmission time units are sequentially the TCI 3, the TCI 4, the TCI 5, the TCI 6, the TCI 7, the TCI 8, and the TCI 9. In this embodiment, optionally, after the largest TCI number in the TCI set or the target TCI subset is traversed, the TCIs in the TCI set or the target TCI subset may be re-traversed in ascending order from the smallest TCI number. In other words, the network device may continue to traverse the TCI set or the target TCI subset, and determine that used TCIs are sequentially the TCI 1, the TCI 2, and the TCI 3. To be specific, the network device may determine that TCIs used to transmit the to-be-transmitted data in a plurality of consecutive transmission time units are sequentially the TCI 4, TCI 5, TCI 6, TCI 7, TCI, 8, TCI 9, TCI 1, TCI 2, and the TCI 3. It is equivalent to that one cyclic increase is completed.

In this embodiment, the first order indicates the cyclic ascending order of the TCIs in the TCI set, and the interval k is equal to 1. If the network device determines that the TCI number used for the first transmission in the plurality of transmissions of the to-be-transmitted data is the TCI 1, and the first order indicates the cyclic ascending order of the numbers of the TCIs in the TCI set, the network device may determine that TCIs used to transmit the to-be-transmitted data in a plurality of consecutive transmission time units are sequentially the TCI 1, the TCI 2, the TCI 3, the TCI 4, the TCI 5, the TCI 6, the TCI 7, the TCI 8, and the TCI 9.

In this embodiment, optionally, k is a positive integer greater than 1. For example, the TCI set is {TCI 1, TCI 2, TCI 3, TCI 4, TCI 5, TCI 6, TCI 7, TCI 8, TCI 9}, and k is equal to 2. If the network device determines that the TCI number used for the first transmission in the plurality of transmissions of the to-be-transmitted data is the TCI 1, the network device may determine that TCIs used to transmit the to-be-transmitted data in a plurality of consecutive transmission time units are sequentially the TCI 1, the TCI 3, the TCI 5, the TCI 7, and the TCI 9. It is equivalent to that the network device determines that the first interval increase. In this embodiment, optionally, after the network device determines the first cyclic interval increase, because there are still untraversed TCIs (the TCI 2, the TCI 4, the TCI 6, and the TCI 8) in the TCI set, the network device may re-traverse the untraversed TCIs at the interval in ascending order from the smallest TCI number after the first interval increase is completed. In this case, because the smallest TCI number in the TCI numbers that are not used after the first interval increase is completed is the TCI 2, the network device may continue to determine that used TCIs are sequentially the TCI 2, the TCI 4, the TCI 6, and the TCI 8. It is equivalent to that the network device determines the second interval increase. Therefore, the network device may determine that TCIs used to transmit the to-be-transmitted data in a plurality of consecutive transmission time units are sequentially the TCI 1, the TCI 3, the TCI 5, the TCI 7, the TCI 9, the TCI 2, the TCI 4, the TCI 6, and the TCI 8. In this case, the network device has traversed all the TCIs in the TCI set. It should be noted that a quantity of interval increases may vary with the interval k. For example, when the interval k is equal to 4, the network device may determine that TCIs used to transmit the to-be-transmitted data in a plurality of consecutive transmission time units are sequentially the TCI 1, the TCI 5, the TCI 9, the TCI 2, the TCI 6, the TCI 3, the TCI 7, the TCI 4, and the TCI 8. It is equivalent to that the network device determines that there are four interval increases.

In another embodiment, the TCI numbers included in the TCI set or the target TCI subset are not strictly increasing. For example, the TCI set may be {TCI 1, TCI 3, TCI 4, TCI 6, TCI 7, TCI 9}. If the first order indicates the cyclic ascending order of the numbers of the TCIs in the TCI set, the network device may determine that TCIs used to transmit the to-be-transmitted data in a plurality of consecutive transmission time units are sequentially the TCI 1, the TCI 3, the TCI 4, the TCI 6, the TCI 7, and the TCI 9.

In another embodiment, when the quantity of times for which the network device sends the to-be-transmitted data to the terminal device is greater than the quantity of TCIs included in the TCI set or the target TCI subset, the network device may traverse the TCI set or the target TCI subset in the first order to obtain the TCIs used for the plurality of transmissions, and re-traverse the TCI set or the target TCI subset after traversing each TCI in the TCI set or the target TCI subset. For example, when the network device sends the to-be-transmitted data to the terminal device for eight times, and the TCI set is {TCI 1, TCI 2, TCI 3, TCI 4}, the first order indicates the cyclic ascending order of the TCIs in the TCI set, and the interval k is equal to 1. If the network device determines that the TCI number used for the first transmission in the plurality of transmissions of the to-be-transmitted data is the TCI 1, after traversing the TCI set, the network device determines that the TCIs used to transmit the to-be-transmitted data in the first four consecutive transmission time units are sequentially the TCI 1, the TCI 2, the TCI 3, and the TCI 4. Then, the network device re-traverses the TCI set, and determines that the TCIs used to transmit the to-be-transmitted data in the last four consecutive transmission time units are sequentially the TCI 1, the TCI 2, the TCI 3, and the TCI 4.

2. Cyclic Descending Order of Numbers of the TCIs in the TCI Set or the Target TCI Subset.

The first order may be the cyclic descending order of the numbers of the TCIs in the TCI set or the target TCI subset. Specifically, the first order may indicate that a TCI number used for a current data transmission is a TCI number used for a data transmission in a previous transmission time unit minus k, where k is a positive integer. In an embodiment, the network device may further determine a TCI number used for the first transmission in the plurality of transmissions of the to-be-transmitted data.

In this embodiment, optionally, k is equal to 1. For example, if the TCI set is {TCI 1, TCI 2, TCI 3, TCI 4, TCI 5, TCI 6, TCI 7, TCI 8, TCI 9}, the first order indicates the cyclic descending order of the TCIs in the TCI set, and the interval k is equal to 1. If the network device determines that the TCI number used for the first transmission in the plurality of transmissions of the to-be-transmitted data is the TCI 3, the network device may determine that TCIs used to transmit the to-be-transmitted data in a plurality of consecutive transmission time units are sequentially the TCI 3, the TCI 2, and the TCI 1. In this embodiment, optionally, after the smallest TCI number in the TCI set or the target TCI subset is traversed, the TCIs in the TCI set or the target TCI subset may be re-traversed in descending order from the largest TCI number in the TCI set or the target TCI subset. In other words, the network device may continue to traverse the TCI set or the target TCI subset, and determine that used TCIs are in an order of TCI 9, TCI 8, TCI 7, TCI 6, TCI 5, and TCI 4. In other words, the network device may determine that TCIs used for to-be-transmitted data in a plurality of consecutive transmission time units are in an order of TCI 3, TCI 2, TCI 1, TCI 9, TCI 8, TCI 7, TCI 6, TCI 5, and TCI 4, that is, a cyclic decrement is completed. If the network device determines that the TCI number used for the first transmission in the plurality of transmissions of the to-be-transmitted data is the TCI 9, and the first order indicates the cyclic descending order of the numbers of the TCIs in the TCI set, the network device may determine that TCIs used to transmit the to-be-transmitted data in a plurality of consecutive transmission time units are sequentially the TCI 9, the TCI 8, the TCI 7, the TCI 6, the TCI 5, the TCI 4, the TCI 3, the TCI 2, and the TCI 1.

In this embodiment, optionally, k is a positive integer greater than 1. For example, the TCI set is {TCI 1, TCI 2, TCI 3, TCI 4, TCI 5, TCI 6, TCI 7, TCI 8, TCI 9}, and k is equal to 2. If the network device determines that the TCI number used for the first transmission in the plurality of transmissions of the to-be-transmitted data is the TCI 9, the network device may determine that TCIs used to transmit the to-be-transmitted data in a plurality of consecutive transmission time units are sequentially the TCI 9, the TCI 7, the TCI 5, the TCI 3, and the TCI 1. It is equivalent to that the network device determines the first interval decrease. In this embodiment, optionally, after the network device determines the first cyclic interval decrease, because there are still untraversed TCIs (the TCI 2, the TCI 4, the TCI 6, and the TCI 8) in the TCI set, the network device may re-traverse the untraversed TCIs at the interval in descending order from the largest TCI number after the first interval decrease is completed. In this case, because the largest TCI number in the TCI numbers that are not used after the first interval decrease is completed is the TCI 8, the network device may continue to determine that used TCIs are sequentially the TCI 8, the TCI 6, the TCI 4, and the TCI 2. It is equivalent to that the network device determines the second interval increase. Therefore, the network device may determine, by using the first interval decrease and the second interval decrease, that TCIs used to transmit the to-be-transmitted data in a plurality of consecutive transmission time units are sequentially the TCI 9, the TCI 7, the TCI 5, the TCI 3, the TCI 1, the TCI 8, the TCI 6, the TCI 4, and the TCI 2. In this case, the network device has traversed all the TCIs in the TCI set. It should be noted that a quantity of interval decreases may vary with the interval k. For example, when the interval k is equal to 4, the network device may determine that TCIs used to transmit the to-be-transmitted data in a plurality of consecutive transmission time units are sequentially the TCI 9, the TCI 5, the TCI 1, the TCI 8, the TCI 4, the TCI 7, the TCI 3, the TCI 6, and the TCI 2. It is equivalent to that the network device determines that there are four interval decreases.

In another embodiment, the TCI numbers included in the TCI set or the target TCI subset are not strictly increasing. For example, the TCI set may be {TCI 1, TCI 3, TCI 4, TCI 6, TCI 7, TCI 9}. If the first order indicates the cyclic descending order of the numbers of the TCIs in the TCI set, the network device may determine that TCIs used to transmit the to-be-transmitted data in a plurality of consecutive transmission time units are sequentially the TCI 9, the TCI 7, the TCI 6, the TCI 4, the TCI 3, and the TCI 1.

In another embodiment, when the quantity of times for which the network device sends the to-be-transmitted data to the terminal device is greater than the quantity of TCIs included in the TCI set or the target TCI subset, the network device may traverse the TCI set or the target TCI subset in the first order to obtain the TCIs used for the plurality of transmissions, and re-traverse the TCI set or the target TCI subset after traversing each TCI in the TCI set or the target TCI subset. For example, when the network device sends the to-be-transmitted data to the terminal device for eight times, and the TCI set is {TCI 1, TCI 2, TCI 3, TCI 4}, the first order indicates the cyclic descending order of the TCIs in the TCI set, and the interval k is equal to 1. If the network device determines that the TCI number used for the first transmission in the plurality of transmissions of the to-be-transmitted data is the TCI 4, after traversing the TCI set, the network device determines that the TCIs used to transmit the to-be-transmitted data in the first four consecutive transmission time units are sequentially the TCI 4, the TCI 3, the TCI 2, and the TCI 1. Then, the network device re-traverses the TCI set, and determines that the TCIs used to transmit the to-be-transmitted data in the last four consecutive transmission time units are sequentially the TCI 4, the TCI 3, the TCI 2, and the TCI 1.

3. Order of the TCIs in the TCI Set.

The first order may be the order of the TCIs in the TCI set. In this embodiment, the plurality of TCIs in the TCI set included in the first information may be set in a preset order. For example, the TCI set may be {TCI 1, TCI 2, TCI 9, TCI 6, TCI 5, TCI 3}. If the first order is the order of the TCIs in the TCI set, the network device may determine that TCIs used to transmit the to-be-transmitted data in a plurality of consecutive transmission time units are sequentially the TCI 1, the TCI 2, the TCI 9, the TCI 6, the TCI 5, and the TCI 3.

It should be understood that the quantity of TCIs included in the TCI set and the TCI numbers in the foregoing examples are merely examples, and may be selected according to an actual requirement in an actual implementation process. This is not limited herein.

In another embodiment, the terminal device determines third information, where the third information is used to indicate to traverse the TCI set in a first order to obtain the TCIs used for the plurality of transmissions, and the first order includes a cyclic ascending order of numbers of the TCIs in the TCI set, or a cyclic descending order of numbers of the TCIs in the TCI set, or an order of the TCIs in the TCI set.

In this embodiment, the network device may determine the third information by using a protocol or a pre-configuration. The third information may indicate to traverse the TCI set in the first order to obtain the TCIs used for the plurality of transmissions. For specific descriptions of the first order herein, refer to the descriptions in the foregoing embodiment. Details are not described herein again.

In another embodiment, the network device may further send the third information to the terminal device, where the third information is used to indicate to traverse the TCI set in a first order to obtain the TCIs used for the plurality of transmissions, and the first order includes the cyclic ascending order of the numbers of the TCIs in the TCI set, or the cyclic descending order of the numbers of the TCIs in the TCI set, or the order of the TCIs in the TCI set.

In this embodiment, the terminal device receives the third information sent by the network device. After the terminal device receives the third information, the terminal device may traverse the TCI set in the first order based on the third information to obtain the TCIs used for the plurality of transmissions. Specifically, after receiving the third information, the terminal device may receive the to-be-transmitted data in the cyclic ascending order of the numbers of the TCIs in the TCI set, or may receive the to-be-transmitted data in the cyclic descending order of the numbers of the TCIs in the TCI set, or may receive the to-be-transmitted data in the order of the TCIs in the TCI set.

For example, in a scenario in which the network device transmits the to-be-transmitted data to the terminal device in a plurality of consecutive transmission time units by using different beams, after receiving the third information, the terminal device may receive the to-be-transmitted data in the plurality of consecutive transmission time units in ascending order of the numbers of the TCIs in the TCI set, or may receive the to-be-transmitted data in the plurality of consecutive transmission time units in descending order of the numbers of the TCIs in the TCI set, or may receive the to-be-transmitted data in the plurality of consecutive transmission time units in the order of the TCIs in the TCI set.

In this embodiment, optionally, the network device may send the third information to the terminal device by using radio resource control (RRC) signaling.

304: The network device sends the to-be-transmitted data to the terminal device for a plurality of times based on the first information.

In this embodiment, the network device may send the to-be-transmitted data to the terminal device for a plurality of times based on the first information. For a method in which the network device sends the to-be-transmitted data to the terminal device for a plurality of times based on the first information, refer to the descriptions in the foregoing embodiment. Details are not described herein again.

In this embodiment, the terminal device receives, based on the first information, the to-be-transmitted data sent by the network device for a plurality of times. The terminal device may receive the to-be-transmitted data by using the corresponding transmission parameters based on the transmission parameters that are used for the plurality of transmissions of the to-be-transmitted data and that are indicated in the first information. For a method in which the terminal device receives, based on the first information, the to-be-transmitted data sent by the network device for a plurality of times, refer to the descriptions in the foregoing embodiment. Details are not described herein again.

In this embodiment, it should be noted that, in another scenario, a plurality of network devices schedule transmission control information to one terminal device. As shown in FIG. 1B, in the scenario shown in FIG. 1B, the network device may alternatively use a multi-beam polling transmission manner. An example in which there are two network devices is used to describe a multi-beam polling transmission process in this scenario. For ease of description, the two network devices are respectively referred to as a device A and a device B. For example, the TCI set is {TCI 1, TCI 2, TCI 3, TCI 4}. The device A sends the to-be-transmitted data to the terminal device in a slot 1 by using a beam corresponding to the TCI 1, the device B sends the to-be-transmitted data to the terminal device in a slot 2 by using a beam corresponding to the TCI 2, the device A sends the to-be-transmitted data to the terminal device in a slot 3 by using a beam corresponding to the TCI 3, and the device B sends the to-be-transmitted data to the terminal device in a slot 4 by using a beam corresponding to the TCI 4. In this case, in the first information, the TCI 1 is associated with an identifier of the device A, the TCI 2 is associated with an identifier of the device B, the TCI 3 is associated with the identifier of the device A, and the TCI 4 is associated with the identifier of the device B. The device A is associated with the TCI 1 and the TCI 3, and the device B is associated with the TCI 2 and the TCI 4. It should be noted that the foregoing description is merely an example. In an actual implementation process, the quantity of network devices may be greater than or equal to 2, and a plurality of network devices may send to-be-transmitted data to the terminal device in a plurality of adjacent slots by using different beams. Further, the network devices may alternatively send the to-be-transmitted data to the terminal device in different time units by using different beams and different antenna ports. This is not limited herein.

It can be learned from the example descriptions of the foregoing embodiment in this application that the network device determines the first information, where the first information is used to indicate the transmission parameters required for the plurality of transmissions of the to-be-transmitted data; the network device sends the first information to the terminal device; the terminal device obtains the first information; and the network device sends the to-be-transmitted data to the terminal device for a plurality of times based on the first information. Because the first information indicates the transmission parameters required for the plurality of transmissions of the to-be-transmitted data, after obtaining the first information, the terminal device may determine, based on the first information, the transmission parameters required for the plurality of transmissions of the to-be-transmitted data, and then receive the to-be-transmitted data for a plurality of times by using the transmission parameters, so that the network device does not need to use DCI to indicate a transmission parameter for each data transmission. This reduces DCI resources and improves cell data transmission performance.

Figure 4:
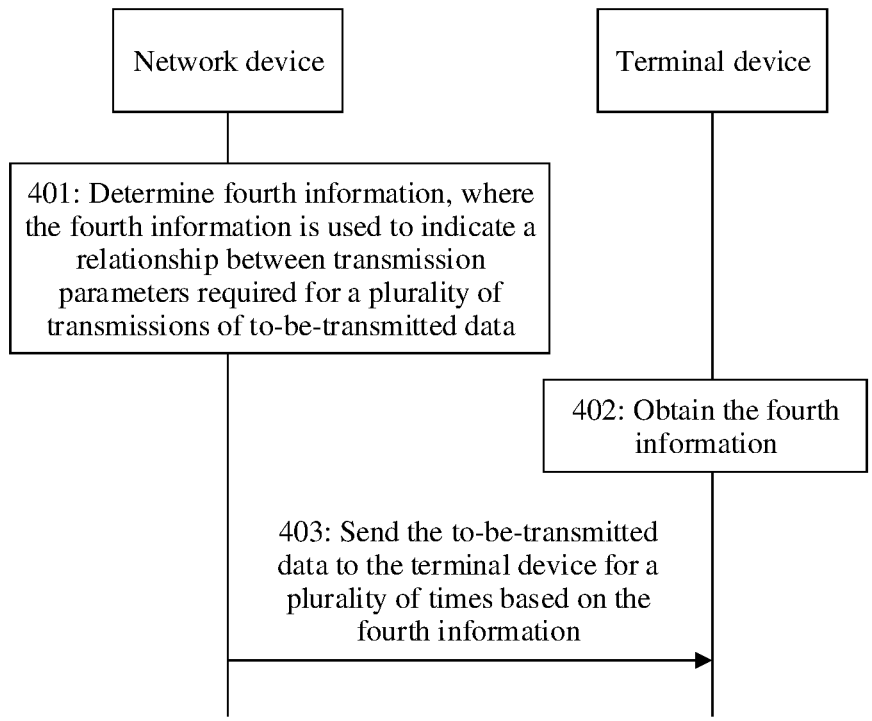
FIG. 4 is a schematic diagram of another embodiment of a data transmission method according to the embodiments of this application.

As shown in FIG. 4, another embodiment of a data transmission method provided in the embodiments of this application includes the following steps.

401: A network device determines fourth information, where the fourth information is used to indicate a relationship between transmission parameters required for a plurality of transmissions of to-be-transmitted data.

In this embodiment of this application, the network device determines the fourth information, where the fourth information may indicate the relationship between the transmission parameters required for the plurality of transmissions of the to-be-transmitted data; and the network device may send the to-be-transmitted data to a terminal device based on the relationship that is indicated by the fourth information and that is between the transmission parameters required for the plurality of transmissions of the to-be-transmitted data.

In this embodiment, the relationship between the transmission parameters required for the plurality of transmissions of the to-be-transmitted data may be a relationship between hybrid automatic repeat request (HARQ) process sequence numbers used for the plurality of transmissions, or may be a relationship between time-frequency resources used for the plurality of transmissions, which is separately described in the following.

In an embodiment, the fourth information is used to indicate that the hybrid automatic repeat request (HARQ) process sequence numbers used for the plurality of transmissions are the same.

In this embodiment, one HARQ process sequence number corresponds to one HARQ process. Generally, there may be eight HARQ process sequence numbers. In a 5G system, there may be 16 HARQ sequence numbers. The fourth information may indicate that the hybrid automatic repeat request (HARQ) process sequence numbers used for the plurality of transmissions are the same, and the network device may use the same HARQ process sequence number for the plurality of transmissions of the to-be-transmitted data based on the fourth information.

In this embodiment, optionally, the network device may send one target HARQ process sequence number to the terminal device, and the network device may use the target HARQ process sequence number for each of the plurality of transmissions of the to-be-transmitted data. Correspondingly, the terminal device may use the target HARQ process sequence number for each of the plurality of transmissions of the to-be-transmitted data. For example, there are eight HARQ process sequence numbers. The HARQ process sequence numbers may include {HARQ 1, HARQ 2, HARQ 3, HARQ 4, HARQ 5, HARQ 6, HARQ 7, and HARQ 8}. If the target HARQ process sequence number is the HARQ 4, the network device may use a HARQ process corresponding to the HARQ 4 for each of the plurality of transmissions of the to-be-transmitted data.

In an embodiment, the fourth information may indicate that the HARQ process sequence numbers used for the plurality of transmissions of the to-be-transmitted data are cyclically increasing or cyclically decreasing.

In this embodiment, from the perspective of time domain, the data transmissions performed by the network device may correspond to the HARQ process sequence numbers in a specific HARQ process sequence number order. The fourth information may indicate that the HARQ process sequence numbers used for the plurality of transmissions of the to-be-transmitted data are cyclically increasing or cyclically decreasing in time domain. For a specific manner in which the fourth information may indicate that the HARQ process sequence numbers used for the plurality of transmissions of the to-be-transmitted data are cyclically increasing or cyclically decreasing, refer to the descriptions in the foregoing embodiment. Details are not described herein again.

In an embodiment, the fourth information may indicate a HARQ process sequence number used for each transmission. For example, the fourth information may indicate that HARQ process sequence numbers used for four transmissions are {HARQ 1, HARQ 4, HARQ 5, HARQ 7}.

In this embodiment, optionally, the network device may receive acknowledgment (ACK) feedback information sent by the terminal device, and the network device releases all HARQ processes used for the plurality of transmissions after receiving the ACK information sent by the terminal device.

In this embodiment, when the fourth information indicates that the hybrid automatic repeat request (HARQ) process sequence numbers used for the plurality of transmissions are the same, it is equivalent to that the HARQ process sequence numbers used by the network device for the plurality of transmissions are the same (for example, the HARQ process sequence numbers used for the transmissions each are the HARQ 1). If the terminal device successfully receives the to-be-transmitted data once, the terminal device feeds back ACK information to the network device. After receiving the ACK information, the network device releases all HARQ process corresponding to the HARQ 1.

In this embodiment, when the fourth information indicates that the HARQ process sequence numbers used for the plurality of transmissions of the to-be-transmitted data are cyclically increasing or cyclically decreasing, it is equivalent to that the HARQ process sequence numbers used by the network device for the plurality of transmissions are different. If the terminal device successfully receives the to-be-transmitted data once, the terminal device feeds back ACK information to the network device. After receiving the ACK information, the network device releases processes corresponding to all the HARQ process sequence numbers used for the plurality of transmissions. It should be noted that only one piece of ACK/NACK information is fed back for one HARQ process, and accordingly a plurality of pieces of ACK/NACK information are fed back for a plurality of HARQ processes. In a multi-beam polling scenario, the network device uses different beams to perform data transmissions. If different HARQ processes are allocated for all the data transmissions, because one piece of ACK/NACK information may be obtained for each HARQ process, one piece of ACK/NACK information may be obtained for each data transmission, in other words, one piece of corresponding ACK/NACK information may be obtained for each beam. Therefore, beam-level link adaptation can be performed for each beam, so that multi-beam transmission performance is improved.

In an embodiment, the fourth information is used to indicate the relationship between the time-frequency resources used for the plurality of transmissions.

In an embodiment, the fourth information is used to indicate at least one of the following information:

a time-domain start position interval used for the plurality of transmissions, a time-domain end position interval used for the plurality of transmissions, a frequency-domain start position interval used for the plurality of transmissions, and a frequency-domain end position interval used for the plurality of transmissions.

In this embodiment, the network device may perform one data transmission in each transmission time unit. Each transmission time unit may include one time-domain start position, and an interval between time-domain start positions of two adjacent transmission time units is a time-domain start position interval. Each transmission time unit may further include one frequency-domain start position, and an interval between frequency-domain start positions of adjacent transmission time units is a frequency-domain start position interval. It should be noted that each transmission time unit may further include one time-domain end position, and an interval between time-domain end positions of two adjacent transmission time units is a time-domain end position interval. Each transmission time unit may further include one frequency-domain end position, and an interval between frequency-domain end positions of adjacent transmission time units is a frequency-domain end position interval.

It should be noted that, in different scenarios in this embodiment, the time-domain start position interval may have different time units, for example, may be N slots, N time domain symbols, N mini slots, or N time units including a plurality of slots or a plurality of mini slots, where N is a positive integer. This is not limited herein. The frequency-domain start position interval may have different time units, for example, may be N frequency domain resource blocks (RB), N subcarriers, N component carriers, or N predefined bandwidth units. This is not limited herein.

In an embodiment, the network device determines the fourth information. The fourth information may indicate at least one of the following information: the time-domain start position interval used for the plurality of transmissions, the time-domain end position interval used for the plurality of transmissions, the frequency-domain start position interval used for the plurality of transmissions, and the frequency-domain end position interval used for the plurality of transmissions. When the fourth information indicates the time-domain start position interval or the time-domain end position interval used for the plurality of transmissions, the network device may perform one data transmission every one time-domain start position interval or one time-domain end position interval in time domain. When the fourth information indicates the frequency-domain start position interval or the frequency-domain end position interval used for the plurality of transmissions, the network device may perform one data transmission every one frequency-domain start position interval or one frequency-domain end position interval in frequency domain. When the fourth information indicates the time-domain start position interval and the frequency-domain start position interval used for the plurality of transmissions, the network device may perform one data transmission every one time-domain start position interval in time domain and one frequency-domain start position interval in frequency domain.

In this embodiment, optionally, the fourth information may include a time-domain start position interval set used for the plurality of transmissions, and the time-domain start position interval set includes a plurality of time-domain start position intervals. It is equivalent to that the fourth information may indicate that the plurality of time-domain start position intervals are used as "alternatives" of the time domain resources of the network device. When sending the to-be-transmitted data for a plurality of times, the network device may determine one of the plurality of time-domain start position intervals as a target time-domain start position interval, and send the to-be-transmitted data to the terminal device for a plurality of times every one target time-domain start position interval in time domain.

In this embodiment, the network device may send the target time-domain start position interval to the terminal device, and the target time-domain start position interval belongs to the time-domain start position interval set. Correspondingly, the terminal device may determine the target time-domain start position interval based on the fifth message, and receive the to-be-transmitted data every one target time-domain start position interval in time domain.

In this embodiment, optionally, the fourth information may include a frequency-domain start position interval set used for the plurality of transmissions, and the frequency-domain start position interval set includes a plurality of frequency-domain start position intervals. It is equivalent to that the fourth information may indicate that the plurality of frequency-domain start position intervals are used as "alternatives" of frequency domain resources of the network device. When sending the to-be-transmitted data for a plurality of times, the network device may determine one of the plurality of frequency-domain start position intervals as a target frequency-domain start position interval, and send the to-be-transmitted data to the terminal device for a plurality of times every one target frequency-domain start position interval in frequency domain.

In this embodiment, the network device may send the target frequency-domain start position interval to the terminal device, and the target frequency-domain start position interval belongs to the frequency-domain start position interval set. Correspondingly, the terminal device may determine the target frequency-domain start position interval based on the sixth message, and receive the to-be-transmitted data every one target frequency-domain start position interval in frequency domain.

In another embodiment, the fourth information may indicate at least one of the following information: a time-domain start position for each of the plurality of transmissions and a frequency-domain start position for each of the plurality of transmissions. For example, the fourth information indicates the time-domain start position for each of the plurality of transmissions. The network device may consider an interval from a time-domain start position to a next time-domain start position as a target time-domain start position interval by default, and perform one data transmission every one target time-domain start position interval in time domain based on the target time-domain start position interval.

In another embodiment, the fourth information may indicate at least one of the following information: a time-domain end position for each of the plurality of transmissions and a frequency-domain end position for each of the plurality of transmissions. For example, the fourth information indicates the time-domain end position for each of the plurality of transmissions. The network device may consider an interval from a time-domain end position to a next time-domain end position as a target time-domain end position interval by default, and perform one data transmission every one target time-domain end position interval in time domain based on the target time-domain end position interval.

In another embodiment, the fourth information may further indicate a time-domain start position for the first data transmission. The network device may use the time-domain start position indicated in the fourth information as the time-domain start position for the first data transmission, and perform one data transmission every one target time-domain start position interval in time domain by using the time-domain start position as a start point.

In another embodiment, the fourth information may further indicate a frequency-domain start position for the first data transmission. The network device may use the frequency-domain start position indicated in the fourth information as the frequency-domain start position for the first data transmission, and perform one data transmission every one target frequency-domain start position interval in frequency domain by using the frequency-domain start position as a start point. In this embodiment, an available time domain resource may be an available symbol, an available slot, or the like. This is not limited herein.

In another embodiment, the network device may use a start position of the available time domain resource as the time-domain start position for the first data transmission, and perform one data transmission every one target time-domain start position interval in time domain by using the time-domain start position as a start point. In this embodiment, the available time domain resource may be an available subband or the like. This is not limited herein.

402: The terminal device obtains the fourth information.

In this embodiment of this application, the terminal device may obtain the fourth information by using a protocol, determine the relationship between the transmission parameters required for the plurality of transmissions of the to-be-transmitted data based on the fourth information, and then receive, based on the relationship between the transmission parameters required for the plurality of transmissions of the to-be-transmitted data, the to-be-transmitted data sent by the terminal device for a plurality of times.

In an embodiment, the network device may send the fourth information to the terminal device, and the terminal device receives the fourth information sent by the network device. Further, the terminal device may obtain the fourth information, determine the relationship between the transmission parameters required for the plurality of transmissions of the to-be-transmitted data based on the fourth information, and receive, by using the relationship between the transmission parameters required for the plurality of transmissions of the to-be-transmitted data, the to-be-transmitted data sent by the terminal device for a plurality of times. For specific descriptions of the fourth information, refer to the foregoing embodiment. Details are not described herein again.

In this embodiment, optionally, the fourth information, the fifth information, and the sixth information may be encapsulated in either or both of the following information: a media access control control element (MAC CE) and a physical downlink control channel (PDCCH).

In this embodiment, optionally, the network device may send one target HARQ process sequence number to the terminal device, and the network device may use the target HARQ process sequence number for each of the plurality of transmissions of the to-be-transmitted data. Correspondingly, the terminal device may use the target HARQ process sequence number for each of the plurality of transmissions of the to-be-transmitted data. For example, there are eight HARQ process sequence numbers. The HARQ process sequence numbers may include {HARQ 1, HARQ 2, HARQ 3, HARQ 4, HARQ 5, HARQ 6, HARQ 7, and HARQ 8}. If the target HARQ process sequence number is the HARQ 4, the network device may use a HARQ process corresponding to the HARQ 4 for each of the plurality of transmissions of the to-be-transmitted data. Correspondingly, the terminal device may use the HARQ process corresponding to the HARQ 4 for each of the plurality of transmissions of the to-be-transmitted data.

403: The network device sends the to-be-transmitted data to the terminal device for a plurality of times based on the fourth information.

In this embodiment, that the network device determines the fourth information is equivalent to determining the relationship between the transmission parameters required for the plurality of transmissions of the to-be-transmitted data. The network device may send the to-be-transmitted data to the terminal device a plurality of times by using a protocol or based on the relationship that is indicated in the fourth information and that is between the transmission parameters required for the plurality of transmissions. For a method in which the fourth information indicates the relationship between the transmission parameters required for the plurality of transmissions, refer to the descriptions in the foregoing embodiment. Details are not described herein again.

In this embodiment, the terminal device receives, based on the fourth information, the to-be-transmitted data sent by the network device for a plurality of times. The terminal device may receive, by using the corresponding transmission parameters based on the relationship that is indicated in the fourth information and that is between the transmission parameters required for the plurality of transmissions, the to-be-transmitted data sent by the network device for a plurality of times. For a method in which the terminal device receives, based on the fourth information, the to-be-transmitted data sent by the network device for a plurality of times, refer to the foregoing embodiment. Details are not described herein again.

It can be learned from the example descriptions of the foregoing embodiment in this application that the network device determines the fourth information, where the fourth information is used to indicate the relationship between the transmission parameters required for the plurality of transmissions of the to-be-transmitted data; the terminal device obtains the fourth information; the network device sends the to-be-transmitted data to the terminal device for a plurality of times based on the fourth information; and the terminal device receives, based on the fourth information, the to-be-transmitted data sent by the network device for a plurality of times. Because the fourth information indicates the relationship between the transmission parameters required for the plurality of transmissions of the to-be-transmitted data, the terminal device may receive the to-be-transmitted data based on the relationship between the transmission parameters required for the plurality of transmissions of the to-be-transmitted data, so that the network device does not need to use DCI to indicate a transmission parameter for each data transmission. This reduces DCI resources and improves cell data transmission performance.

Figure 5:
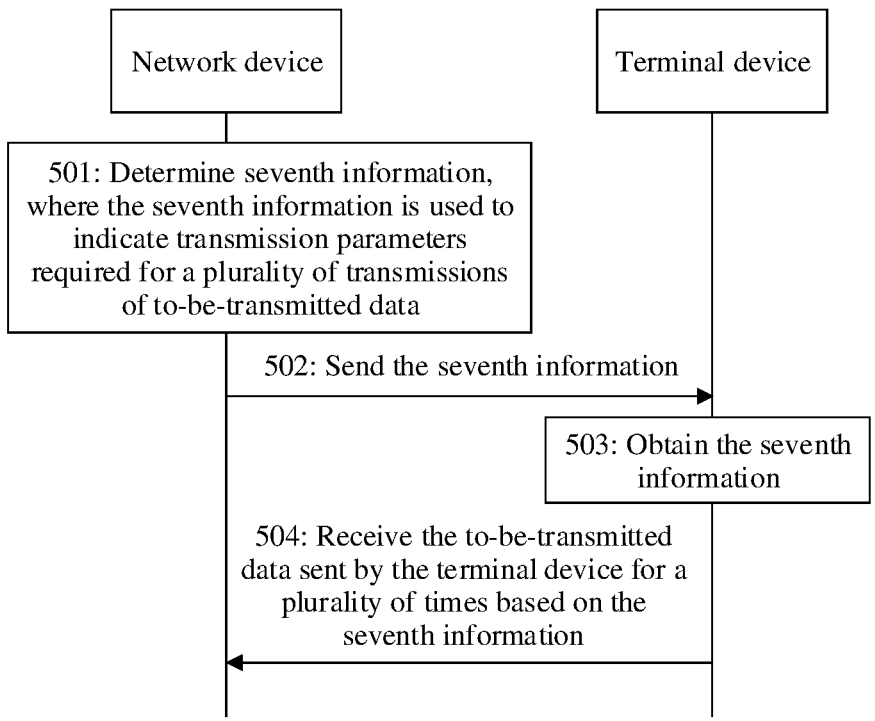
FIG. 5 is a schematic diagram of another embodiment of a data transmission method according to the embodiments of this application.

FIG. 5 is a schematic diagram of another embodiment of a data transmission method according to the embodiments of this application. The another embodiment of the data transmission method provided in the embodiments of this application includes the following steps.

501: A network device determines seventh information, where the seventh information is used to indicate transmission parameters required for a plurality of transmissions of to-be-transmitted data.

In this embodiment of this application, in an uplink transmission scenario, a terminal device may transmit the to-be-transmitted data to the network device for a plurality of times in different transmission time units by using different beams. In addition, the network device needs to indicate, to the terminal device, the transmission parameters required for the plurality of uplink data transmissions, and the terminal device may send the to-be-transmitted data to the network device for a plurality of times by using the transmission parameters indicated by the network device.

In this embodiment of this application, the network device may determine the seventh information before indicating, to the terminal device, the transmission parameters required for the plurality of uplink data transmissions. The seventh information is used to indicate the transmission parameters required for the plurality of uplink transmissions of the to-be-transmitted data.

502: The network device sends the seventh information to the terminal device.

In this embodiment of this application, the network device sends the seventh information to the terminal device to indicate the transmission parameters required for the plurality of uplink transmissions. After receiving the seventh information, the terminal device may learn of the transmission parameters required for the plurality of uplink transmissions, and further send the to-be-transmitted data to the network device for a plurality of times by using the transmission parameters indicated by the seventh information.

In an embodiment, the seventh information may include a sounding reference signal resource indicator (SRI) set, the SRI set includes a plurality of SRIs, and SRIs used for the plurality of transmissions belong to the SRI set. In this embodiment, each SRI may correspond to one of the plurality of uplink transmissions of the to-be-transmitted data, each SRI may indicate one SRS resource, and each SRS resource corresponds to one beam. That the network device sends the seventh information to the terminal device is equivalent to indicating, to the terminal device, beams corresponding to the plurality of uplink data transmissions. After receiving the seventh information, the terminal device may learn of the beams required for the plurality of uplink data transmissions. The terminal device may determine, based on a correspondence between an SRS resource indicator and each uplink transmission of the to-be-transmitted data, the beams corresponding to the transmissions, and then send the to-be-transmitted data to the network device for a plurality of times by using the beams.

In this embodiment, optionally, the network device may further send eighth information to the terminal device, where the eighth information is used to indicate a target SRI subset, and the target SRI subset is a subset of the SRI set. Further, each SRI in the target SRI subset corresponds to one of the plurality of uplink transmissions of the to-be-transmitted data.

In this embodiment, the SRIs in the SRI set may be configured in a second order. After receiving the SRI set, the terminal device may traverse the SRI set or the target SRI subset in the second order to obtain the SRIs used for the plurality of uplink transmissions. Further, the terminal device may transmit the to-be-transmitted data to the network device for a plurality of times in different transmission time units by using the beams corresponding to the SRIs in the second order indicated by the SRIs.

In this embodiment, optionally, when a quantity of times for which the terminal device sends the to-be-transmitted data to the network device is greater than a quantity of SRIs included in the SRI set or the target SRI subset, the SRIs in the SRI set or the target SRI subset may be reused. The terminal device may traverse the SRI set or the target SRI subset in the second order to obtain the SRIs used for the plurality of uplink transmissions, and re-traverse the SRI set or the target SRI subset in the second order after traversing each SRI in the SRI set or the target SRI subset.

In this embodiment, it should be noted that, as shown in FIG. 1B, in another scenario, a plurality of network devices schedule transmission control information to one terminal device. In this scenario, the seventh information may further include an identifier of a network device that receives the to-be-transmitted data and/or a quantity of network devices that receive the to-be-transmitted data for the terminal device. In other words, in addition to indicating the SRI corresponding to each of the plurality of uplink transmissions, the seventh information further needs to indicate an identifier of a network device that receives the to-be-transmitted data during each uplink transmission. In other words, in addition to indicating the beam used for each uplink transmission, the seventh information further needs to indicate a specific network device that receives the to-betransmitted data during each uplink transmission. Specifically, each SRI in the SRI set may be associated with one network device. It should be noted that, in this scenario, the quantity of network devices may be less than the quantity of SRIs used for the plurality of transmissions. Optionally, in the seventh information, the identifier of the network device may be associated with at least one SRI in the SRI set. In other words, one network device may be associated with a plurality of SRIs.

In this embodiment, optionally, the seventh information may indicate that hybrid automatic repeat request (HARQ) process sequence numbers used for the plurality of uplink transmissions are the same. Correspondingly, after receiving the seventh information, the terminal device uses a same HARQ process sequence number for the plurality of uplink transmissions of the to-be-transmitted data.

In this embodiment, optionally, the seventh information may indicate that HARQ process sequence numbers used for the plurality of uplink transmissions of the to-be-transmitted data are cyclically increasing or cyclically decreasing.

In this embodiment, optionally, the seventh information may indicate at least one of the following information:
  a time-domain start position interval used for the plurality of uplink transmissions, a time-domain end position interval used for the plurality of uplink transmissions, a frequency-domain start position interval used for the plurality of uplink transmissions, and a frequency-domain end position interval used for the plurality of uplink transmissions.

In this embodiment, optionally, the network device may send the seventh information to the terminal device by using radio resource control (RRC) signaling, for example, may configure the seventh information in the RRC signaling; and the terminal device may receive, by using the RRC signaling, the seventh information sent by the network device.

In this embodiment, optionally, the network device may send the eighth information to the terminal device through a media access control control element (MAC CE) or a physical downlink control channel (PDCCH).

503: The terminal device obtains the seventh information.

In this embodiment, the terminal device may obtain the seventh information by receiving the seventh information sent by the network device, so that the terminal device can obtain the transmission parameters required for the plurality of transmissions.

504: The network device receives the to-be-transmitted data sent by the terminal device for a plurality of times based on the seventh information.

In this embodiment, the terminal device may send the to-be-transmitted data to the network device for a plurality of times based on the seventh information. Correspondingly, the network device may receive the to-be-transmitted data sent by the terminal device for a plurality of times based on the seventh information.

To better implement the foregoing solutions in the embodiments of this application, the following further provides related apparatuses for implementing the foregoing solutions.

Figure 6:
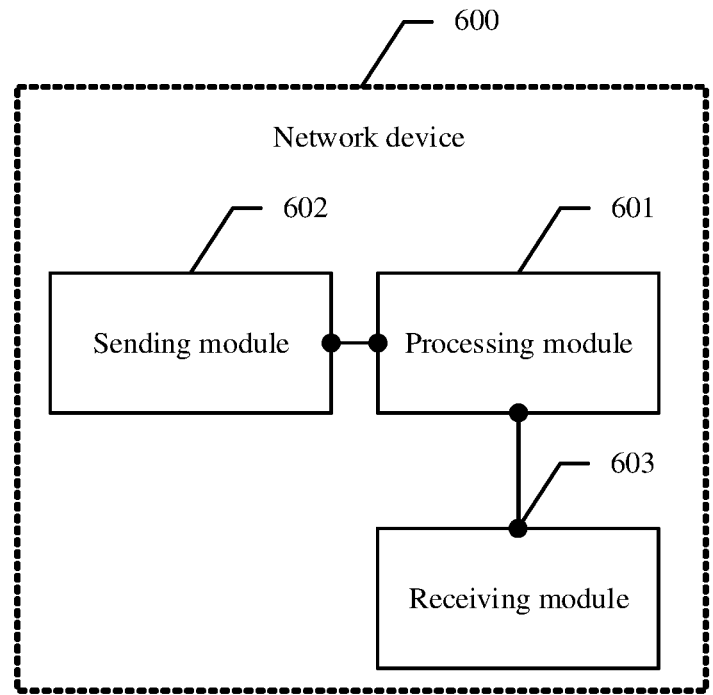
FIG. 6 is a schematic diagram of an embodiment of a network device according to the embodiments of this application.

FIG. 6 is a schematic structural block diagram of a network device 600 according to an embodiment of this application. As shown in FIG. 6, the network device 600 includes a processing module 601, a sending module 602, and a receiving module 603.

Optionally, the modules included in the network device 600 are respectively configured to implement the data transmission method and corresponding operations and/or procedures in the embodiment of the data transmission method.

Specifically, the processing module 601, the sending module 602, and the receiving module 603 are respectively configured to perform the following operations.

The processing module 601 is configured to support the network device in performing the determining step of the network device in the embodiment, another function other than functions of the sending module and the receiving module, and the like.

The sending module 602 is configured to support the network device in performing the sending step of the network device in the embodiment.

The receiving module 603 is configured to support the network device in performing the receiving step of the network device in the embodiment.

Optionally, the network device 600 may alternatively be a chip or an integrated circuit.

Optionally, the sending module 602 may be a transceiver, the receiving module 603 may be a receiver, and the processing module 601 may be a processor. Alternatively, the sending module 602 may be an output interface or an output circuit, and the receiving module 603 may be an input interface or an input circuit.

Optionally, the sending module 602 and the receiving module 603 may be integrated into a communications module, and the communications module may include the sending module 602 and the receiving module 603. The communications module may alternatively be a transceiver, and the transceiver may include a transmitter and a receiver to jointly implement receiving and sending functions.

Figure 7:
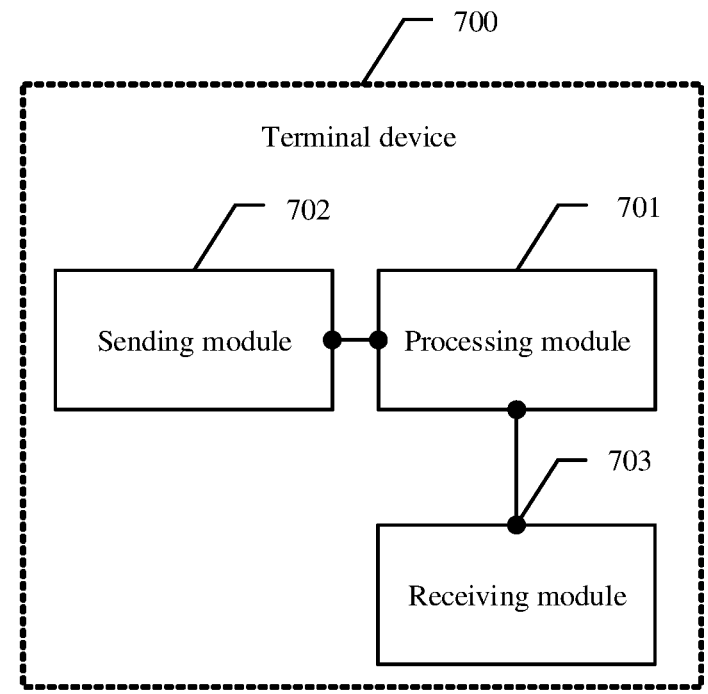
FIG. 7 is a schematic diagram of an embodiment of a terminal device according to the embodiments of this application.

FIG. 7 is a schematic structural block diagram of a terminal device 700 according to an embodiment of this application. As shown in FIG. 7, the terminal device 700 includes a processing module 701, a sending module 702, and a receiving module 703.

Optionally, the modules included in the terminal device 700 are respectively configured to implement the data transmission method and corresponding operations and/or procedures in the embodiment of the data transmission method.

Specifically, the processing module 701, the sending module 702, and the receiving module 703 are respectively configured to perform the following operations.

The processing module 701 is configured to support the terminal device in performing the determining step of the terminal device in the embodiment, another function other than functions of the sending module and the receiving module, and the like.

The sending module 702 is configured to support the terminal device in performing the sending step of the terminal device in the embodiment.

The receiving module 703 is configured to support the terminal device in performing the receiving step of the terminal device in the embodiment.

Optionally, the terminal device 700 may be a chip or an integrated circuit.

Optionally, the sending module 702 may be a transceiver, the receiving module 703 may be a receiver, and the processing module 701 may be a processor. Alternatively, the sending module 702 may be an output interface or an output circuit, and the receiving module 703 may be an input interface or an input circuit.

Optionally, the sending module 702 and the receiving module 703 may be integrated into a communications module, and the communications module may include the sending module 702 and the receiving module 703. The communications module may alternatively be a transceiver, and the transceiver may include a transmitter and a receiver to jointly implement receiving and sending functions.

Figure 8:
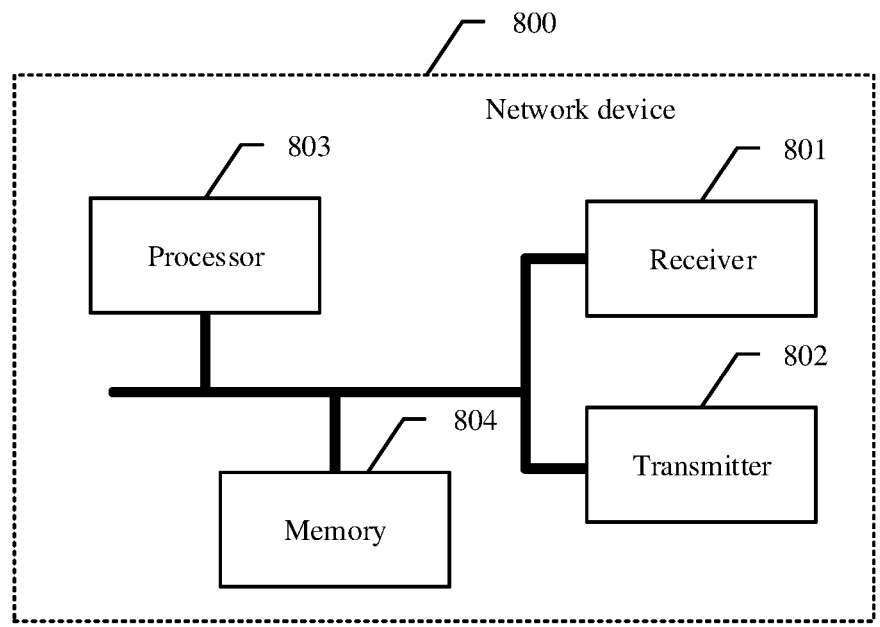
FIG. 8 is a schematic diagram of another embodiment of a network device according to the embodiments of this application.

As shown in FIG. 8, an embodiment provides a network device 800. The network device includes at least one processor 803 and a memory 804. The at least one processor 803 and the memory 804 communicate with each other.

The memory 804 is configured to store instructions.

The at least one processor 803 is configured to execute the instructions in the memory, to perform the data transmission method performed by the network device.

The network device 800 includes a receiver 801, a transmitter 802, the processor 803, and the memory 804 (there may be one or more processors 803 in the network device 800, and one processor is used as an example in FIG. 8). In some embodiments of this application, the receiver 801, the transmitter 802, the processor 803, and the memory 804 may be connected through a bus or in another manner. In FIG. 8, an example in which the receiver 801, the transmitter 802, the processor 803, and the memory 804 are connected through a bus is used.

The memory 804 may include a read-only memory and a random access memory, and provide the processor 803 with an instruction and data. A part of the memory 804 may further include an NVM. The memory 804 stores an operating system and an operation instruction, or an executable module or a data structure, or a subnet thereof, or an extended set thereof. The operation instruction may include various operation instructions to implement various operations. The operating system may include various system programs to implement various basic services and process hardware-based tasks.

The processor 803 controls an operation of the network device. The processor 803 may also be referred to as a CPU. During specific application, the components of the network device are coupled together through a bus system. In addition to a data bus, the bus system may further include a power bus, a control bus, a status signal bus, and the like. However, for clear description, various types of buses in the figure are marked as the bus system.

The data transmission methods disclosed in the foregoing embodiments of this application may be applied to the processor 803, or may be implemented by the processor 803. The processor 803 may be an integrated circuit chip and has a signal processing capability. In an implementation process, the steps of the foregoing methods may be completed by using a hardware integrated logic circuit in the processor 803, or by using instructions in a form of software. The processor 803 may be a general-purpose processor, a DSP, an ASIC, an FPGA or another programmable logic device, a discrete gate or a transistor logic device, or a discrete hardware component. The methods, the steps, and logic block diagrams that are disclosed in the embodiments of this application may be implemented or performed. The general-purpose processor may be a microprocessor, or the processor may be any conventional processor or the like. The steps of the methods disclosed with reference to the embodiments of this application may be directly presented as being performed and completed by a hardware decoding processor, or performed and completed by a combination of hardware in a decoding processor and a software module. The software module may be located in a mature storage medium in the art, such as a random access memory, a flash memory, a read-only memory, a programmable read-only memory, an electrically erasable programmable memory, or a register. The storage medium is located in the memory 804, and the processor 803 reads information in the memory 804 and completes the steps in the foregoing methods in combination with hardware of the processor.

Figure 9:
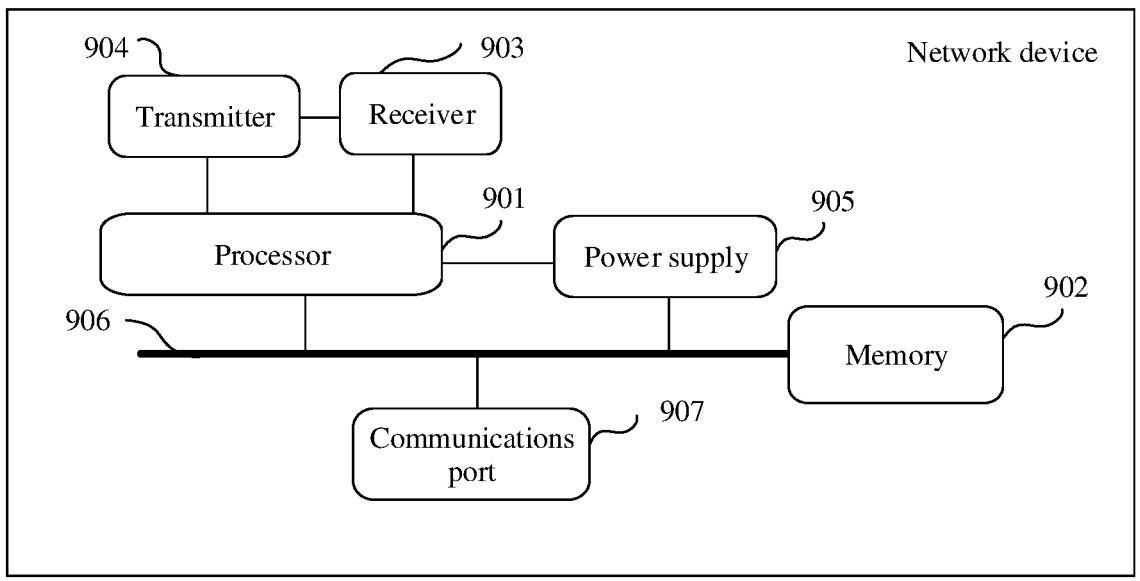
FIG. 9 is a schematic diagram of another embodiment of a network device according to the embodiments of this application.

FIG. 9 is a schematic structural diagram of another device according to an embodiment of this application. The device is a network device, and the network device may include a processor 901 (for example, a CPU), a memory 902, a receiver 903, and a transmitter 904. The receiver 903 and the transmitter 904 are coupled to the processor 901, and the processor 901 controls a receiving action of the receiver 903 and a sending action of the transmitter 904. The memory 902 may include a high-speed RAM, or may include a nonvolatile memory (NVM), for example, at least one magnetic disk memory. The memory 902 may store various instructions, to implement various processing functions and implement method steps of this embodiment of this application. Optionally, the network device in this embodiment of this application may further include one or more of a power supply 905, a communications bus 906, and a communications port 907. The receiver 903 and the transmitter 904 may be integrated into a transceiver of the network device, or may be a receive antenna and a transmit antenna that are independent of each other on the network device. The communications bus 906 is configured to implement communication connection between the components. The communications port 907 is configured to implement communication connection between the network device and another peripheral.

In this embodiment of this application, the memory 902 is configured to store computer-executable program code. The program code includes instructions. When the processor 901 executes the instructions, the processor 901 is enabled to perform the processing action of the network device in the foregoing method embodiment, and the transmitter 904 is enabled to perform the sending action of the network device in the foregoing method embodiment. Implementation principles and technical effects thereof are similar. Details are not described herein again.

For example, the processor 901 may correspond to the processing module 701 in FIG. 7, the transmitter 904 may correspond to the sending module 702 in FIG. 7, and the receiver 903 may correspond to the receiving module 703 in FIG. 7.

Figure 10:
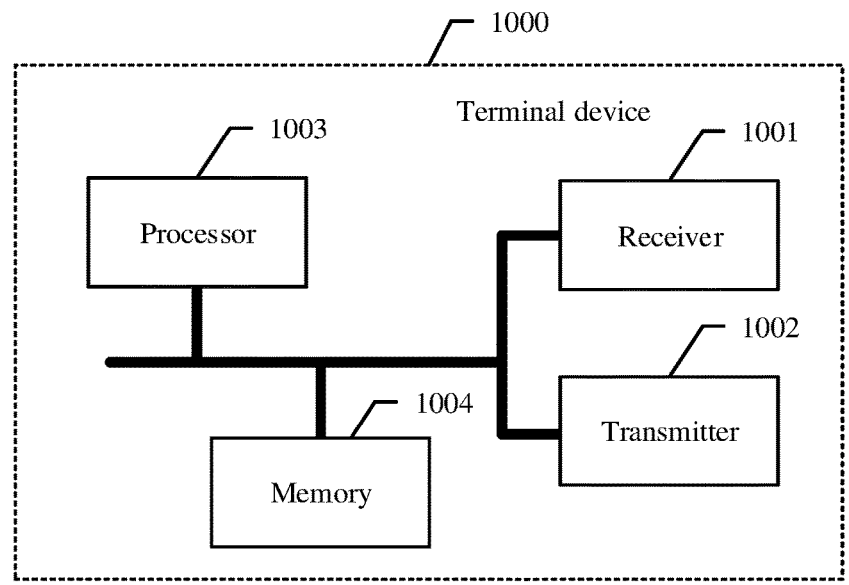
FIG. 10 is a schematic diagram of another embodiment of a terminal device according to the embodiments of this application.

As shown in FIG. 10, an embodiment provides a terminal device 1000. The terminal device 1000 includes a receiver 1001, a transmitter 1002, a processor 1003, and a memory 1004 (there may be one or more processors 1003 in the terminal device 1000, and one processor is used as an example in FIG. 10). In some embodiments of this application, the receiver 1001, the transmitter 1002, the processor 1003, and the memory 1004 may be connected through a bus or in another manner. In FIG. 10, an example in which the receiver 1001, the transmitter 1002, the processor 1003, and the memory 1004 are connected through a bus is used.

The memory 1004 may include a read-only memory and a random access memory, and provide the processor 1003 with an instruction and data. A part of the memory 1004 may further include a nonvolatile random access memory (NVRAM). The memory 1004 stores an operating system and an operation instruction, or an executable module or a data structure, a subset thereof, or an extended set thereof. The operation instruction may include various operation instructions to implement various operations. The operating system may include various system programs to implement various basic services and process hardware-based tasks.

The processor 1003 controls an operation of the terminal device. The processor 1003 may also be referred to as a central processing unit (CPU). During specific application, the components of the terminal device are coupled together through a bus system. In addition to a data bus, the bus system may further include a power bus, a control bus, a status signal bus, and the like. However, for clear description, various types of buses in the figure are marked as the bus system.

The methods disclosed in the foregoing embodiments of this application may be applied to the processor 1003, or may be implemented by the processor 1003. The processor 1003 may be an integrated circuit chip and has a signal processing capability. In an implementation process, the steps of the foregoing methods may be completed by using a hardware integrated logic circuit in the processor 1003 or by using instructions in a form of software. The processor 1003 may be a general-purpose processor, a digital signal processor (DSP), an application-specific integrated circuit (ASIC), a field programmable gate array (FPGA) or another programmable logic device, a discrete gate or a transistor logic device, or a discrete hardware component. The methods, the steps, and logic block diagrams that are disclosed in the embodiments of this application may be implemented or performed. The general-purpose processor may be a microprocessor, or the processor may be any conventional processor or the like. The steps of the methods disclosed with reference to the embodiments of this application may be directly presented as being performed and completed by a hardware decoding processor, or performed and completed by a combination of hardware in a decoding processor and a software module. The software module may be located in a mature storage medium in the art, such as a random access memory, a flash memory, a read-only memory, a programmable read-only memory, an electrically erasable programmable memory, or a register. The storage medium is located in the memory 1004, and the processor 1003 reads information in the memory 1004 and completes the steps in the foregoing methods in combination with hardware of the processor.

The receiver 1001 may be configured to: receive entered digital or character information, and generate a signal input related to a related setting and function control of the terminal device. The transmitter 1002 may include a display device such as a display, and the transmitter 1002 may be configured to output digital or character information through an external interface.

Figure 11:
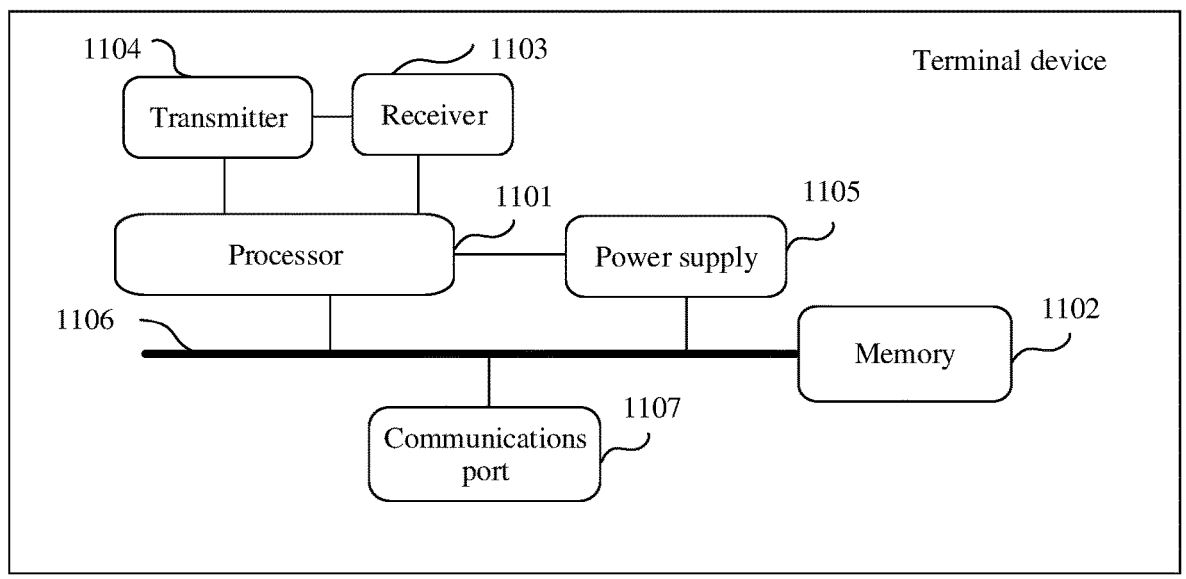
FIG. 11 is a schematic diagram of another embodiment of a terminal device according to the embodiments of this application.

FIG. 11 is a schematic structural diagram of another device according to an embodiment of this application. The device is a terminal device, and the terminal device may include a processor 1101 (for example, a CPU), a memory 1102, a transmitter 1104, and a receiver 1103. The transmitter 1104 and the receiver 1103 are coupled to the processor 1101, and the processor 1101 controls a sending action of the transmitter 1104 and a receiving action of the receiver 1103. The memory 1102 may include a high-speed RAM, or may include a nonvolatile memory (NVM), for example, at least one magnetic disk memory. The memory 1102 may store various instructions, to implement various processing functions and implement method steps of this embodiment of this application. Optionally, the terminal device in this embodiment of this application may further include one or more of a power supply 1105, a communications bus 1106, and a communications port 1107. The receiver 1103 and the transmitter 1104 may be integrated into a transceiver of the terminal device, or may be a receive antenna and a transmit antenna that are independent of each other on the terminal device. The communications bus 1106 is configured to implement communication connection between the components. The communications port 1107 is configured to implement communication connection between the terminal device and another peripheral.

In this embodiment of this application, the memory 1102 is configured to store computer-executable program code. The program code includes instructions. When the processor 1101 executes the instructions, the processor 1101 is enabled to perform the processing action of the terminal device in the foregoing method embodiment, and the transmitter 1104 is enabled to perform the sending action of the terminal device in the foregoing method embodiment. Implementation principles and technical effects thereof are similar. Details are not described herein again.

In addition, this application provides a computer-readable storage medium. The computer-readable storage medium stores computer instructions, and when the computer instructions are run on a computer, the computer is enabled to perform corresponding operations and/or procedures performed by the terminal device in the data transmission methods in the embodiments of this application.

This application further provides a computer program product. The computer program product includes computer program code, and when the computer program code is run on a computer, the computer is enabled to perform corresponding operations and/or procedures performed by the terminal device in the data transmission methods in the embodiments of this application.

This application further provides a chip, and the chip includes a processor. The processor is configured to invoke and run a computer program stored in a memory, to perform corresponding operations and/or procedures performed by the terminal device in the data transmission methods in the embodiments of this application. Optionally, the chip further includes the memory. The memory is connected to the processor through a circuit or a cable. The processor is configured to read the computer program from the memory and execute the computer program. Optionally, the chip further includes a communications interface. The processor is connected to the communications interface. The communications interface is configured to receive data and/or information that needs to be processed. The processor obtains the data and/or information from the communications interface, and processes the data and/or information. The communications interface may be an input/output interface.

This application provides a computer-readable storage medium. The computer-readable storage medium stores computer instructions, and when the computer instructions are run on a computer, the computer is enabled to perform corresponding operations and/or procedures performed by the network device in the data transmission methods in the embodiments of this application.

This application further provides a computer program product. The computer program product includes computer program code, and when the computer program code is run on a computer, the computer is enabled to perform corresponding operations and/or procedures performed by the network device in the data transmission methods in the embodiments of this application.

Figure 12:
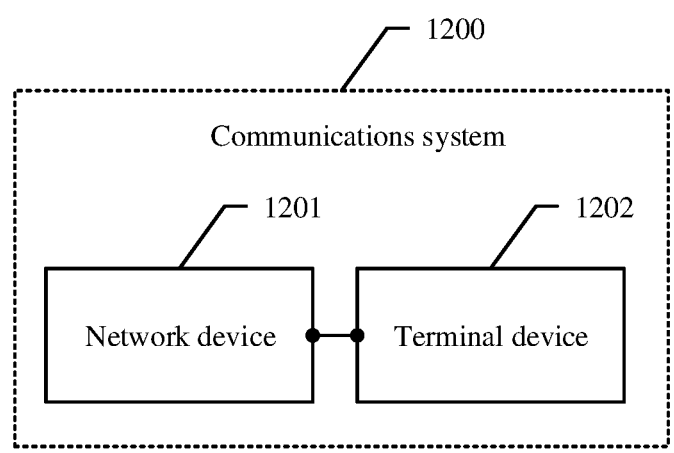
FIG. 12 is a schematic diagram of an embodiment of a communications system according to the embodiments of this application.

As shown in FIG. 12, an embodiment of this application provides a communications system 1200. The communications system 1200 includes: a network device 1201, configured to perform the data transmission method performed by the foregoing network device; and a terminal device 1202, configured to perform the data transmission method performed by the foregoing terminal device.

The communications system 1200 includes the network device 1201 in any one of FIG. 6, FIG. 8, and FIG. 9 and the terminal device 1202 in any one of FIG. 7, FIG. 10, and FIG. 11.

It should be noted information exchange between the modules/units of the apparatus (for example, the network device or the terminal device), the execution processes thereof, and other content are based on the same idea as the method embodiments of this application, and produce the same technical effects as the method embodiments of this application. For the specific content, refer to the descriptions in the foregoing method embodiments of this application. Details are not described herein again.

In another possible design, when the apparatus (for example, the terminal device) is a chip in the terminal device, the chip may include a processing unit and a communications unit. The processing unit may be, for example, a processor. The communications unit may be, for example, an input/output interface, a pin, or a circuit. The processing unit may execute computer-executable instructions stored in a storage unit, so that the chip in the terminal device is enabled to perform the method according to any one of the implementations of the first aspect. The storage unit may be a storage unit in the chip, for example, a register or a cache. The storage unit may alternatively be a storage unit that is in the terminal device but outside the chip, for example, a read-only memory (ROM), another type of static storage device that can store static information and an instruction, or a random access memory (RAM).

In another possible design, when the apparatus (for example, the network device) is a chip in the network device, the chip may include a processing unit and a communications unit. The processing unit may be, for example, a processor. The communications unit may be, for example, an input/output interface, a pin, or a circuit. The processing unit may execute computer-executable instructions stored in a storage unit, so that the chip in the network device is enabled to perform the method according to the second aspect and any one of the implementations of the second aspect. The storage unit may be a storage unit in the chip, for example, a register or a cache. The storage unit may alternatively be a storage unit that is in the network device but outside the chip, for example, a read-only memory (ROM), another type of static storage device that can store static information and an instruction, or a random access memory (RAM).

The processor mentioned above may be a general-purpose central processing unit (CPU), a microprocessor, an application-specific integrated circuit (ASIC), or one or more integrated circuits configured to control program execution of the wireless communication method according to the first aspect.

In addition, it should be noted that the described apparatus embodiments are merely examples. The units described as separate parts may or may not be physically separate, and parts displayed as units may or may not be physical units, in other words, may be located in one position, or may be distributed on a plurality of network units. Some or all of the modules may be selected according to an actual requirement to achieve the objectives of the solutions of the embodiments. In addition, in the accompanying drawings of the apparatus embodiments provided in this application, connection relationships between modules indicate that the modules have communication connections with each other, which may be specifically implemented as one or more communications buses or signal cables. Function units in the embodiments of this application may be integrated into one processing unit, or each of the units may exist alone physically, or two or more units may be integrated into one unit.

For example, the memory mentioned in this specification may be integrated into the processor, or may be independent of the processor.

Mutual reference may be made to related parts in the method embodiments of this application. The apparatus provided in each apparatus embodiment is configured to perform a method provided in a corresponding method embodiment. Therefore, for each apparatus embodiment, refer to a related part in a related method embodiment for understanding. Mutual reference may also be made between the apparatus embodiments.

Structural diagrams of the apparatuses in the apparatus embodiments of this application merely show simplified designs of the corresponding apparatuses. During actual application, the apparatus may include any quantities of transceivers (which may include a transmitter and a receiver), processors, memories, and the like, to implement functions or operations performed by the apparatuses in the apparatus embodiments of this application, and all apparatuses that can implement this application fall within the protection scope of this application.

Based on the descriptions of the foregoing implementations, a person skilled in the art may clearly understand that this application may be implemented by using software in addition to necessary universal hardware, or by using dedicated hardware including an application-specific integrated circuit, a dedicated CPU, a dedicated memory, a dedicated component, and the like. Generally, any function that can be performed by a computer program can be easily implemented by corresponding hardware. Moreover, a specific hardware structure used to achieve a same function may be of various forms, for example, in a form of an analog circuit, a digital circuit, or a dedicated circuit. However, for this application, software program implementation is a better implementation in most cases. Based on such an understanding, the technical solutions of this application essentially or the part contributing to the prior art may be implemented in a form of a software product. The computer software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, or the like) to perform the methods described in the embodiments of this application.

All or some of the foregoing embodiments may be implemented by using software, hardware, firmware, or any combination thereof. When the software is used to implement the embodiments, the embodiments may be implemented fully or partially in a form of a computer program product.

The computer program product includes one or more computer instructions. When the computer program instructions are loaded and executed on a computer, the procedure or functions according to the embodiments of this application are fully or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A method, comprising:
receiving, by a terminal device, downlink control information (DCI) from a network device, wherein the DCI indicates at least two transmission configuration indicator (TCI)-states;
receiving a radio resource control (RRC) signaling from the network device, wherein the RRC signaling configures a total quantity of transmission times that a same transport block (TB) is to be transmitted by the network device in different time units corresponding to the at least two TCI-states; and
receiving, by the terminal device, the same TB in the different time units using the at least two TCI-states, wherein the same TB is transmitted by the network device in each time unit of the different time units, wherein a time interval is between two adjacent time units in which the same TB is transmitted by the network device, and the time interval is configured by the network device for the terminal device.

2. The method according to claim 1, wherein the at least two TCI-states and the total quantity of transmission times meet a transmission manner, and the transmission manner comprises:
cyclically traversing the at least two TCI-states in sequence to perform transmission until the total quantity of transmission times is reached.

3. The method according to claim 2, wherein the transmission manner is configured by the network device for the terminal device.

4. The method according to claim 3, wherein the transmission manner is configured by the network device for the terminal device using radio resource control (RRC) signaling.

5. A method, comprising:
sending, by a network device, downlink control information (DCI) to a terminal device, wherein the DCI indicates at least two transmission configuration indicator (TCI)-states;
sending a radio resource control (RRC) signaling to the terminal device, wherein the RRC signaling configures a total quantity of transmission times that a same transport block (TB) is to be transmitted by the network device in different time units corresponding to the at least two TCI-states; and
sending, by the network device, the same TB in each time unit of the different time units using the at least two TCI-states, wherein a time interval is between two adjacent time units in which the same TB is transmitted by the network device, and the time interval is configured by the network device for the terminal device.

6. The method according to claim 5, wherein the at least two TCI-states and the total quantity of transmission times meet a transmission manner, and the transmission manner comprises:
cyclically traversing the at least two TCI-states in sequence to perform transmission until the total quantity of transmission times is reached.

7. The method according to claim 6, wherein the transmission manner is configured by the network device for the terminal device.

8. The method according to claim 7, wherein the transmission manner is configured by the network device for the terminal device using radio resource control (RRC) signaling.

9. An apparatus, comprising:
at least one processor in communication with a non-transitory computer-readable storage medium storing a program that is executable by the at least one processor, the program including instructions for:
receiving downlink control information (DCI) from a network device, wherein the DCI indicates at least two transmission configuration indicator (TCI)-states;
receiving a radio resource control (RRC) signaling from the network device, wherein the RRC signaling configures a total quantity of transmission times that a same transport block (TB) is to be transmitted by the network device in different time units corresponding to the at least two TCI-states; and
receiving the same TB in the different time units using the at least two TCI-states, wherein the same TB is transmitted by the network device in each time unit of the different time units, wherein a time interval is between two adjacent time units in which the same TB is transmitted by the network device, and the time interval is configured by the network device for a terminal device.

10. The apparatus according to claim 9, wherein the at least two TCI-states and the total quantity of transmission times meet a transmission manner, and the transmission manner comprises:
cyclically traversing the at least two TCI-states in sequence to perform transmission until the total quantity of transmission times is reached.

11. The apparatus according to claim 10, wherein the transmission manner is configured by the network device for the terminal device.

12. The apparatus according to claim 11, wherein the transmission manner is configured by the network device for the terminal device using radio resource control (RRC) signaling.

13. The apparatus according to claim 9, wherein the apparatus is the terminal device or a chip of the terminal device.

14. An apparatus, comprising:
at least one processor in communication with a non-transitory computer-readable storage medium storing a program that is executable by the at least one processor, the program including instructions for:
sending downlink control information (DCI) to a terminal device, wherein the DCI indicates at least two transmission configuration indicator (TCI)-states;
sending a radio resource control (RRC) signaling to the terminal device, wherein the RRC signaling configures a total quantity of transmission times that a same transport block (TB) is to be transmitted by the apparatus in different time units corresponding to the at least two TCI-states; and
sending the same TB in each time unit of the different time units using the at least two TCI-states, wherein a time interval is between two adjacent time units in which the same TB is transmitted by the apparatus, and the time interval is configured by the apparatus for the terminal device.

15. The apparatus according to claim 14, wherein the at least two TCI-states and the total quantity of transmission times meet a transmission manner, and the transmission manner comprises:
cyclically traversing the at least two TCI-states in sequence to perform transmission until the total quantity of transmission times is reached.

16. The apparatus according to claim 15, wherein the transmission manner is configured by the apparatus for the terminal device.

17. The apparatus according to claim 16, wherein the transmission manner is configured by the apparatus for the terminal device using radio resource control (RRC) signaling.

* * * * *